United States Patent Office 3,662,008
Patented May 9, 1972

3,662,008
PROCESS FOR PREPARING β-SANTALOL
FROM 3-METHYLNORCAMPHOR
Herbert C. Kretschmar, Greenhills, and William F.
Erman, Springfield Township, Hamilton County, Ohio,
assignors to The Procter & Gamble Company, Cincinnati, Ohio
No Drawing. Filed May 21, 1969, Ser. No. 826,682
Int. Cl. C07c 35/02
U.S. Cl. 260—631.5
6 Claims

ABSTRACT OF THE DISCLOSURE

A process for preparing β-santalol, useful in perfume compositions, from 3-methylnorcamphor comprising the steps of (1) alkylating 3-methylnorcamphor in strong base with an allyl halide; (2) reacting the reaction product of Step (1) with a methylmetallic compound, such as methyllithium, followed by hydrolysis; (3) brominating the reaction product of Step (2); (4) dehydrobrominating the reaction product of Step (3) with a base, such as sodium amide; (5) dehydrating the reaction product of Step (4) with a dehydrating agent, such as thionyl chloride; (6) reacting the reaction product of Step (5) with a compound, such as di(sec.-iso-amyl)borane followed by an oxidation; (7) reacting the reaction product of Step (6) with (carbethoxyethylidene)triphenylphosphorane; and (8) reducing the reaction product of Step (7) with a reducing agent, such as lithium aluminum hydride, to obtain β-santalol, and novel compounds produced therein are disclosed.

FIELD OF THE INVENTION

This invention relates to a process for preparing β-santalol, a component of sandalwood oil, having a valuable sandalwood odor and useful in perfume compositions. The process involves an 8-step synthesis from 3-methylnorcamphor. This invention also relates to novel compounds produced as intermediates in the process for preparing β-santalol.

BACKGROUND OF THE INVENTION

East Indian sandalwood oil has heretofore been available only from East Indian sandalwood trees. This oil and various individual components of the oil are highly valued perfume bases and are used in large quantities by the perfume industry. The oil, however, is expensive and is in limited, and sometimes sporadic, supply. For this reason, a continuous effort has been made to synthesize the various components of sandalwood oil or similar synthetic materials which possess the desirable woody fragrance of sandalwood oil.

The process presented herein for preparing β-santalol from 3-methylnorcamphor represents a portion of an extensive scientific effort to obtain β-santalol, a valuable component of sandalwood oil. Other processes and intermediate compounds related to the synthesis of β-santalol are described in the following copending U.S. patent applications: Herbert C. Kretschmar, Wayne I. Fanta and William F. Erman, Ser. No. 731,653, filed May 23, 1968, for Process for Preparing 3-Endo-Methylnorcamphor From 2 - Methylnorborn - 2 - Ene; Thomas W. Gibson, Herbert C. Kretschmar and William F. Erman, Ser. No. 731,652, filed May 23, 1968, for Process for Preparing 3-Methylnorcamphor From 2-Methylnorborn-2-Ene and Herbert C. Kretschmar and William F. Erman, Ser. No. 826,684 filed May 21, 1969, for Process for Preparing β-Santalol From 3-Methylnorcamphor, filed concurrently herewith.

SUMMARY OF THE INVENTION

The process of this invention for the preparation of β-santalol comprises the steps of (1) Alkylating 3 - methylbicyclo[2.2.1]heptan - 2-one having the structural formula

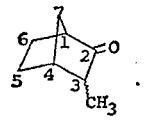

in strong base selected from the group consisting of sodium amide, lithium amide, potassium amide, sodium hydride, lithium hydride, potassium hydride, trityl sodium, trityl potassium, and trityl lithium with an allyl halide selected from the group consisting of allyl chloride, allyl bromide, and allyl iodide to obtain endo-3-methyl-exo-3 (1' - prop-2'-enyl)-bicyclo[2.2.1]heptan-2-one having the structural formula

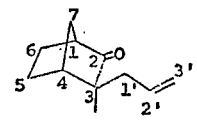

(2) Reacting endo - 3 - methyl-exo-3(1'-prop-2'-enyl)-bicyclo[2.2.1]heptan-2-one of Step (1) with a methylmetallic compound selected from the group consisting of methyllithium and methylmagnesium bromide, followed by a hydrolysis to obtain exo-2-methyl-endo-3-methylendo - 2 - hydroxy - exo-3(1'-prop-2'-enyl)bicyclo[2.2.1]heptane having the structural formula

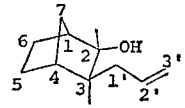

(3) Brominating exo-2-methyl-endo-3-methyl-endo-2-hydroxy-exo-3(1'-prop-2'-enyl)bicyclo[2.2.1]-heptane of Step (2) with bromine to obtain exo-2-methyl-endo-3-methyl - endo - 2-hydroxy-exo-3(2',3'-dibromopropyl)bicyclo[2.2.1]heptane having the structural formula

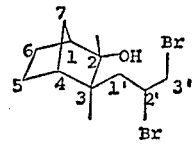

(4) Dehydrobrominating exo-2-methyl-endo-3-methylendo - 2 - hydroxy - exo-3(2',3'-dibromopropyl)-bicyclo [2.2.1]heptane of Step (3) with a strong base selected from the group consisting of sodium amide, potassium amide, and lithium amide to obtain exo-2-methyl-endo-3-methyl - endo - 2 - hydroxy-exo-3(1'-prop-2'-ynyl)bicyclo [2.2.1]-heptane having the structural formula

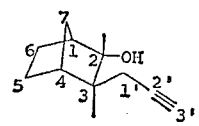

(5) Dehydrating exo - 2 - methyl-endo - 3 - methylendo - 2 - hydroxy - exo - 3(1' - prop-2'-ynyl)bicyclo [2.2.1]-heptane of Step (4) with a dehydrating agent selected from the group consisting of thionyl chloride, phosphorus oxychloride, boron trifluoride, aluminum oxide, sulfuric acid and p-toluene sulfonic acid to obtain endo-3 - methyl - exo - 3(1' - prop - 2' - ynyl)-2-methylenebicyclo[2.2.1]heptane having the structural formula

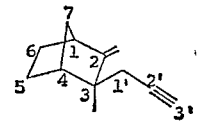

(6) Reacting endo - 3 - methyl - exo - 3(1' - prop-2'-ynyl) - 2 - methylenebicyclo[2.2.1]heptane of Step (5) with a compound selected from the group consisting of di(sec-iso-amyl)borane, di(methyl-1-en-9-yl)-borane, di-(cyclohexyl)borane, and di(iso-butyl)aluminum hydride followed by an alkaline peroxide oxidation to obtain endo - 3 - methyl - exo - 3 - (3'-oxopropyl)-2-methylenebicyclo[2.2.1]heptane having the structural formula

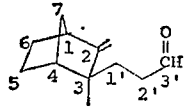

(7) Reacting endo - 3 - methyl - exo - 3 - (3'-oxopropyl) - 2 - methylenebicyclo[2.2.1]heptane of Step (6) with (carbethoxyethylidene)triphenylphosphorane to obtain endo - 3 - methyl - exo - 3(cis-4'-carbethoxypent-3'-enyl)-2-methylenebicyclo[2.2.1]heptane having the structural formula

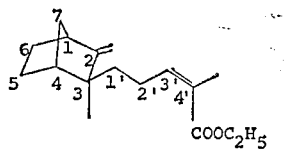

and endo - 3 - methyl - exo - 3(trans-4'-carbethoxy-pent-3' - enyl) - 2 - methylenebicyclo[2.2.1]heptane having the structural formula

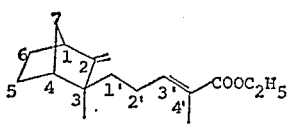

and (8) Reducing endo-3-methyl - exo - 3(cis-4'-carbethoxypent-3'-enyl) - 2 - methylenebicyclo[2.2.1]heptane and endo - 3 - methyl - exo - 3(trans-4'-carbethoxypent-3'-enyl) - 2 - methylenebicyclo[2.2.1]heptane of Step (7) with a reducing agent selected from the group consisting of lithium aluminum hydride, sodium in an alcohol solvent, potassium in an alcohol solvent, and lithium in an alcohol solvent, to obtain endo-3-methyl-exo-3(cis-5'-hydroxy - 4' - methylpent - 3' - enyl) - 2 - methylenebicyclo[2.2.1]heptane having the structural formula

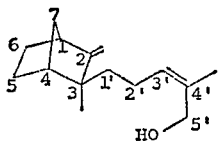

and endo - 3 - methyl - exo - 3(trans - 5'-hydroxy-4'-methylpent - 3' - enyl) - 2 - methylenebicyclo[2.2.1]heptane having the structural formula

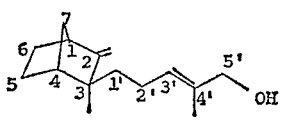

The product of the process described above is a mixture of endo - 3 - methyl - exo - 3(cis-5'-hydroxy-4'-methylpent - 3' - enyl) - 2 - methylenebicyclo[2.2.1] heptane (cis-β-santalol) and endo - 3 - methyl-exo-3(trans-5'-hydroxy - 4' - methylpent - 3' - enyl)-2-methylenebicyclo[2.2.1]heptane (trans-β-santalol). As used herein the term β-santalol without the designation cis or trans is intended to refer to the mixture of the two geometric isomers. β-Santalol, the product of the above process, possesses a desirable, woody sandalwood fragrance and, thus, has utility as a perfume per se and is useful as a component in perfume compositions. The cis-isomer and the trans-isomer can be separated and are individually useful as odorants per se and as components in perfume compositions. In addition, the intermediates produced in the above process are novel compounds and some of the intermediates are useful as odorants per se having a distinctive fragrance in addition to their utility as intermediates in the process of this invention.

In the process described above, the reactants used and the products obtained are described using I.U.P.A.C. (International Union of Pure and Applied Chemistry) nomenclature. Because of the length of the I.U.P.A.C. names describing the starting materials, intermediates and the reaction products of the above process, trivial nomenclature will be used hereinafter in the discussions of the process of this invention in order to simplify the disclosure to follow. I.U.P.A.C. nomenclature is used in the examples given hereinafter. The trivial names used in the description of the process of this invention which are associated with each of the above I.U.P.A.C. names are shown in the following table:

| I.U.P.A.C. name | Trivial name |
| --- | --- |
| 3-methylbicyclo[2.2.1]-heptan-2-one (endo and exo isomers). | 3-methylnorcamphor (endo and exo isomers). |
| endo-3-methyl-exo-3-(prop-2'-enyl)-bicyclo-[2.2.1]heptan-2-one. | endo-3-methyl-3-propenylnorcamphor. |
| exo-2-methyl-endo-3-methyl-endo-2-hydroxy-3-(1'-prop-2'-enyl)-bicyclo[2.2.1]heptane. | 8-ethenyl-epi-camphene hydrate. |
| exo-2-methyl-endo-3-methyl-endo-2-hydroxy-exo-3(2'3'-dibromopropyl)-bicyclo[2.2.1]heptane. | 8(1,2-dibromoethyl)-epi-camphene hydrate. |
| exo-2-methyl-endo-3-methyl-endo-2-hydroxy-exo-3(1'-prop-2'-ynyl)bicyclo[2.2.1]-heptane. | 8-ethynyl-epi-camphene hydrate. |
| endo-3-methyl-exo-3-(1'-prop-2'-ynyl)-2-methylenebicyclo[2.2.1]heptane. | 8-ethynyl-camphene. |
| Endo-3-methyl-exo-3(3'-oxopropyl)-2-methylenebicyclo[2.2.1]heptane. | Eka-β-santalal. |
| Endo-3-methyl-exo-3(4'-carbethoxypent-3'-enyl)-2-methylenebicyclo-[2.2.1]heptane (cis and trans). | Ethyl-β-santalate (cis and trans). |
| Endo-3-methyl-exo-3(5'-hydroxy-4'-methylpent-3'-enyl)-2-methylenebicyclo[2.2.1]-heptane (cis and trans). | β-santalol (cis and trans). |

DETAILED DESCRIPTION OF THE INVENTION

Starting material

The initial starting material, 3-methylnorcamphor, and processes for preparing the starting material, are described in the following copending U.S. patent applications: Herbert C. Kretschmar, Wayne I. Fanta, and William F. Erman, Ser. No. 731,653, filed May 23, 1968, for Process for Preparing 3-endo-Methylnorcamphor From 2-Methyl-Norborn-2-Ene; and Thomas W. Gibson, Herbert C. Kretschmar, and William F. Erman, Ser. No. 731,652, filed May 23, 1968, for Process for Preparing 3 - Methylnorcamphor From 2- Methyl-Norborn-2-Ene. The allyl halide is commercially avaliable.

The starting material, i.e., 2-methylnorborn-2-ene, for use in the processes described by Kretschmar, Fanta and Erman, supra, and by Gibson, Kretschmar, and Erman, supra, can be advantageously and cheaply prepared by the method generally described by Alder and Ache in Chem. Ber. 95, 503–10 (1962) by which methylcyclopentadiene and ethylene, both of which are commercially available, are condensed under high temperatures and pressures to form 2-methylnorborn-2-ene. Generally, a large molar excess of ethylene, e.g., 2 to 50 moles of ethylene per mole of methylcyclopentadiene, is utilized with the methylcyclopentadiene. The reaction time, although dependent on the reaction conditions and molar ratios of reactants, generally ranges from about 1 hour to about 10 hours at ordinary reaction conditions of temperatures ranging from about 100° C. to about 400° C. and ethylene pressures ranging from about 1,000 p.s.i. to 5,000 p.s.i.

In the process described by Gibson, Kretschmar, and Erman, supra, 2-methylnorborn-2-ene is reacted with a dialkyl aluminum hydride such as di-iso-butyl aluminum hydride, dibutylaluminum hydride, or dipentyl aluminum hydride to obtain 2 - exo-dialkylalumino-3-endo-methylnorbornane. The 2-exo-dialkylalumino-3-endo-methylnorbornane is oxidized with oxygen gas to obtain 3-endo-methylnorborneol and finally the 3-endo-methylnorborneol is oxidized with a strong oxidizing agent, such as chromium trioxide, potassium permanganate, t-butyl chromate, or potassium dichromate, to obtain 3-methylnorcamphor which is a mixture of isomers, i.e., 3-exo-methylnorcamphor and 3-endo-methylnorcamphor. The temperatures, reaction conditions and molar ratios, etc., are described more fully in the hereinbefore cited copending patent application.

In the process described by Kretschmar, Fanta, and Erman, supra, 2-methylnorborn-2-ene (obtainable from the reaction of ethylene and methylcyclopentadiene as described above) is reacted with a peracid, such as performic acid, perphthalic acid, perbenzoic acid or peracetic acid, to obtain an epoxide, 2-endo-methyl-2,3-exo-epoxynorbornane. The epoxide is then reacted with a catalytic amount of an acid, e.g., oxalic acid, hydrogen bromide or hydrogen chloride or a Lewis acid such as aluminum chloride, boron trifluoride or stannic chloride. The reaction product obtained in 3 - endo-methylnorcamphor.

The starting material for use in the process of this invention, 3-methylnorcamphor, can also be prepared according to the method described by Corey, Hartman and Vatakencherry in J. Am. Chem. Soc., 84, 2611 (1962), in which 3-methylnorcamphor is utilized in preparing one of the hydrocarbon components of East Indian sandalwood oil. In this process 3-methylnorcamphor is described as a useful and necessary intermediate prepared from norcamphor " . . . by reaction of an ethereal solution of the sodium enolate [of norcamphor] generated from sodium amide or trityl sodium on the ketone [norcamphor] with excess methyl iodide . . . ."

Step (1)

The first step of the process of this invention comprises alkylating 3-methylnorcamphor with an allyl halide such as allyl chloride, allyl bromide, or allyl iodide to obtain endo - 3-methyl-3-propenylcamphor according to the following:

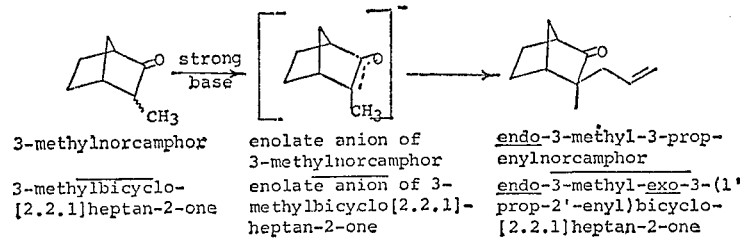

3-methylnorcamphor   enolate anion of 3-methylnorcamphor   endo-3-methyl-3-propenylnorcamphor 3-methylbicyclo-[2.2.1]heptan-2-one   enolate anion of 3-methylbicyclo[2.2.1]-heptan-2-one   endo-3-methyl-exo-3-(1'prop-2'-enyl)bicyclo-[2.2.1]heptan-2-one This alkylation reaction proceeds through the enolate anion of 3-methylnorcamphor. The enolate anion of 3-methylnorcamphor is formed by treating the starting material, 3-methylnorcamphor, with a strong base. Suitable such strong bases are trityl sodium, trityl potassium, trityl lithium, sodium hydride, lithium hydride, potassium hydride, potassium amide, lithium amide, and sodium amide. Sodium hydride and sodium amide are the preferred strong bases for use in forming the enolate anion of 3-methylnorcamphor. The strong base is generally used in a molar ratio of 3-methylnorcamphor to strong base of from about 1:1 to about 1:1.5, preferably from about 1:1.05 to about 1:1.1.

In the formation of the enolate anion normally the 3-methylnorcamphor is dissolved in a solvent (such as an aromatic hydrocarbon solvent, an ether solvent, or an aliphatic hydrocarbon solvent) under an inert atmosphere.

Suitable aromatic hydrocarbon solvents for use in dissolving the 3-methylnorcamphor are toluene, xylene and benzene, with toluene and xylene being preferred. Suitable ether solvents are diethyl ether, dimethyl ether, methylethyl ether, dibutyl ether, tetrahydrofuran, 1,2-dimethoxyethane, and dioxane, with tetrahydrofuran being preferred. Suitable aliphatic hydrocarbon solvents are pentane, hexane, heptane, octane, cyclopentane, cyclohexane, and cyclooctane. The solvent used, examples of which are listed above, is preferably anhydrous. If the solvent used is not anhydrous, the strong base will preferentially react with the water contained in the solvent and thus the yield of the enolate anion of 3-methylnorcamphor is reduced. Suitable inert gases for protection against moisture in the air are argon, helium and nitrogen, with nitrogen being preferred.

The strong base and the 3-methylnorcamphor are allowed to stand, with stirring at from about 80° C. to about 130° C. and where an anhydrous solvent is used the formation of the enolate anion of 3-methylnorcamphor normally is completed after about four to about five hours. Where desired the formation of the enolate anion of 3-methylnorcamphor can be monitored by observing the rate of hydrogen evolution formed in the treatment of 3-methylnorcamphor with strong base. The weight ratio of 3-methylnorcamphor to solvent used generally ranges from about 1:2 to about 1:10, with from about 1:3 to about 1:7 being preferred.

After the enolate ion of 3-methylnorcamphor is formed, the allyl halide, such as allyl chloride, allyl bromide or allyl iodide, is added to the mixture containing the enolate anion of 3-methylnorcamphor. Allyl bromide is preferred. The ratio of 3-methylnorcamphor to the allyl halide used is not a critical consideration but generally a slight excess of allyl halide is used in order to ensure that all of the 3-methylnorcamphor is converted in Step (1). Molar ratios of about 2:1 to about 1:5 of 3-methylnorcamphor to allyl halide are suitable, with about 1:1.05 to about 1:1.1 being preferred.

The temperature at which the enolate anion of 3-methylnorcamphor is reacted with the allyl halide normally can range from about 30° C. to about 170° C., with the preferred range being from about 80° C. to about 130° C. The reaction of the allyl halide with the enolate anion of 3-methylnorcamphor is fairly rapid and the period of addition of the allyl halide to the solution containing the 3-methylnorcamphor enolate anion can range from about five minutes to about ten hours. The reaction is quite exothermic and a large amount of heat is generated due to the reaction of the allyl halide with the enolate anion of 3-methylnorcamphor. As a result the allyl halide is usually added dropwise, with stirring, to the solution containing the enolate anion of 3-methylnorcamphor. The allyl halide can be added as a pure material or in a solution of one of the above-mentioned solvents. Because of the exothermic nature of the reaction, dissolution of the allyl halide in a solvent is preferable because addition of the allyl halide can be controlled better. The allyl halide/solvent mixture is then added dropwise, with stirring, to the solution containing the strong base and the 3-methylnorcamphor. Where the allyl halide is dissolved in one of the above solvents, the weight ratio of allyl halide to solvent generally ranges from about 1:2 to about 1:10, preferably from about 1:3 to about 1:7.

The time of the reaction of the allyl halide with the enolate anion of 3-methylnorcamphor will depend upon the temperature at which the reaction is run and the solution concentration which is used. With lower temperatures and lower concentrations the reaction will be slow and at higher temperatures and higher concentrations the reaction will be faster. Where the allyl halide is dissolved in a solvent in the above-mentioned concentration, and added dropwise, and the temperature of reaction is controlled in the preferred range of from about 80° C. to about 130° C. the reaction time normally is from about 4 to about 5 hours with high yields being obtained.

The starting material, 3-methylnorcamphor, exists in two stereoisomeric forms—one where the methyl group is endo in the bicyclic ring system (i.e., cis to the two-carbon atom bridge) and the second where the methyl group is exo in the bicyclic ring system (i.e., trans to the two-carbon atom bridge). The use of strong base converts both of these isomers to the enolate ion of 3-methylnorcamphor, a planar intermediate. Either endo-3-methylnorcamphor, exo-3-methylnorcamphor, or mixtures of the two isomers can be used as the starting material in the process of this invention even though the side chain of the product of the process of this invention, β-santalol, has a specific stereochemical orientation. The addition of the allyl halide to the planar enolate anion occurs from the exo face of the bicyclic structure regardless of the starting material because of steric hindrance to endo addition. As a result the side-chain stereochemistry necessary for the formation of the β-santalol end product of this process is assured.

The product of Step (1) of the process of this invention, endo-3-methyl-3-propenylnorcamphor, can be purified by conventional techniques, e.g., distillation or column chromatography, where desired. Endo-3-methyl-3-propenylnorcamphor is a novel compound and, in addition to being useful as an intermediate in the process for preparing β-santalol, is useful as an odorant per se. Endo-3-methyl-3-propenylnorcamphor obtained in Step (1) of the process of this invention possesses valuable odor characteristics, having a fruity odor, and therefore is useful as a perfume where this type of odor is desired or can be used in perfume compositions where a fruity note is desired.

Step (2)

The reaction product of Step (1) of the process of this invention, endo-3-methyl-3-propenylnorcamphor, is used as the starting material in Step (2) of the process of this invention. In Step (2) endo-3-methyl-3-propenylnorcamphor is reacted with a methylmetallic compound selected from the group consisting of methyllithium and methylmagnesium bromide followed by hydrolysis forming 8-ethenyl-epi-camphene hydrate according to the following:

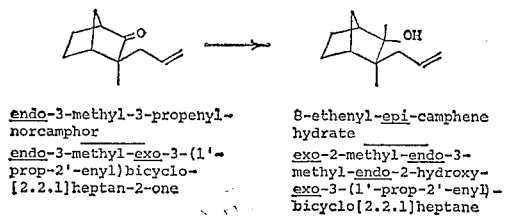

endo-3-methyl-3-propenyl-
norcamphor
endo-3-methyl-exo-3-(1'-
prop-2'-enyl)bicyclo-
[2.2.1]heptan-2-one 8-ethenyl-epi-camphene
hydrate
exo-2-methyl-endo-3-
methyl-endo-2-hydroxy-
exo-3-(1'-prop-2'-enyl)-
bicyclo[2.2.1]heptane In Step (2) of the process of this invention the methyllithium or methylmagnesium bromide reacts with the carbonyl group of the starting material and after hydrolysis the olefinic alcohol, 8-ethenyl-epi-camphene hydrate, is formed. The reaction is normally a high yield reaction and the reactants are generally used in a molar ratio of endo-3-methyl-3-propenylnorcamphor to methylmetallic, of from about 1:1 to about 1:5. Preferably a slight excess, e.g., from about 1:1.05 to about 1:1.1, of the methylmetallic compound is used to assure complete conversion of the starting material to 8-ethenyl-epi-camphene hydrate.

In this step of the process of this invention the endo-3-methyl-3-propenylnorcamphor is generally dissolved in an anhydrous solvent. Suitable solvents are ether solvents such as dimethyl ether, diethyl ether, methylethyl ether, dibutyl ether, tetrahydrofuran, 1,2-dimethoxyethane, and dioxane; aromatic hydrocarbon solvents such as benzene, toluene, and xylene; and aliphatic hydrocarbon solvents such as pentane, hexane, heptane, octane, cyclopentane, cyclohexane, and cyclooctane. Ether solvents are generally preferred with diethyl ether being especially preferred. Use of diethyl ether as the solvent is advantageous because methyllithium is commercially available in diethyl ether and the methyl magnesium bromide is usually prepared in diethyl ether. The starting material, endo-3-propenylnorcamphor, is generally used in a weight ratio to solvent of from about 1:3 to about 1:20, preferably from about 1:5 to about 1:10. The reaction occurring in Step (2) is quite exothermic and the use of more dilute solutions, e.g., 1:10, facilitates temperature control during the reaction.

The temperature of the reaction is not critical and can range of about —20° C. to about 10° C. The reaction essentially is instantaneous; however, depending on the recation conditions the reaction time can range from about five minutes to about four hours, more normally from about 30 minutes to about one hour. During the course of the reaction the reaction mixture is stirred continuously as the solution containing the methylmetallic compound is added dropwise to the solution containing the starting material, endo-3-methyl-3-propenylnorcamphor. The order of addition of reactants is not important and the solution containing the methylmetallic compound can be added directly to the solution containing the endo-3-methyl-3-propenylnorcamphor or vice versa. Generally an inert atmosphere is used in order to prevent the methylmetallic compound from coming into contact with water or oxygen. Suitable inert atmospheres are argon, nitrogen, and helium. Argon or nitrogen is preferred.

Once the reaction of endo-3-methyl-3 propenylnorcamphor with the methylmetallic compound is completed, the intermediate lithium alkoxide salt or the magnesium bromide salt is converted to the alcohol generally by the addition of water or water acidified with a small amount of any mineral acid.

The product of Step (2) of the process of this invention, 8-ethenyl-epi-camphene hydrate, is a novel compound. The reaction product of Step (2) is used as the starting material in Step (3) of the process for preparing β-santalol. In addition to being valuable as the starting material in Step (3), 8-ethenyl-epi-camphene hydrate is useful as an dorant per se, having a spicy, herbacious odor. Thus, 8-ethenyl-epi-camphene hydrate produced in Step (2) can be purified by conventional methods, e.g., distillation, and used in perfume compositions where an odorant having these odor characteristics is desired.

Step (3)

Step (3) of the process of this invention involves the bromination of 8-ethenyl-epi-camphene hydrate obtained as the reaction product of Step (2). In Step (3) 8-ethenyl-epi-camphene hydrate is brominated to obtain 8(1,2-dibromoethyl)-epi-camphene hydrate according to the following:

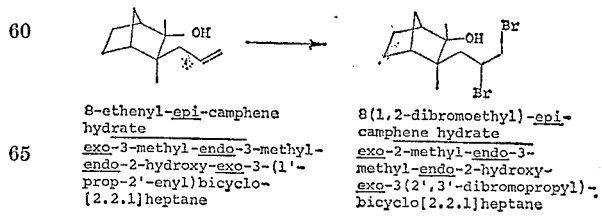

8-ethenyl-epi-camphene
hydrate
exo-3-methyl-endo-3-methyl-
endo-2-hydroxy-exo-3-(1'-
prop-2'-enyl)bicyclo-
[2.2.1]heptane 8(1,2-dibromoethyl)-epi-
camphene hydrate
exo-2-methyl-endo-3-
methyl-endo-2-hydroxy-
exo-3(2',3'-dibromopropyl)-
bicyclo[2.2.1]heptane In Step (3) the starting material, 8-ethenyl-epi-camphene, is brominated with bromine to obtain the saturated dibromo alcohol, 8(1,2-dibromoethyl)-epi-camphene. hydrate. The molar ratio of 8-ethenyl-epi-camphene hydrate to bromine used generally ranges from about 1:0.8 to about 1:1, preferably from about 1:0.90 to about 1:0.95. In general it is preferred that the 8-ethenyl-epi-camphene hydrate be present in a slight excess, e.g., about 1:0.90 to about 1:0.95, to the amount of bromine used. A slight excess is used to promote high yields of 8(1,2-dibromoethyl)-epi-camphene hydrate, since if bromine be present in excess, the hydroxyl group can be oxidized.

In Step (3) of the process of this invention a solvent is generally used. Suitable solvents which can be used in this step of the process are solvents, such as the chlorinated hydrocarbon solvents (e.g., carbon tetrachloride, chloroform, methylene chloride, and 1,2-dichloroethane, with carbon tetrachloride being preferred) and the aliphatic hydrocarbon solvents (e.g., pentane, hexane, heptane, octane, cyclopentane, cyclohexane, and cyclooctane with pentane, hexane, and cyclopentane being preferred). The starting material, 8-ethenyl-epi-camphene hydrate, is generally used in a weight ratio to the solvent of from about 1:5 to about 1:100, preferably from about 1:10 to about 1:20.

The temperature of the reaction in Step (3) can generally range from about −20° C. to about 20° C., preferably from about −5° C. to about 5° C. This step of the process of this invention is a moderately fast reaction but is not as rapid as the hereinbefore-described two steps. The reaction time will, of course, be dependent upon the temperature at which the reaction is run and upon the concentration of the reactants used but generally ranges from about 30 minutes to about four hours and more normally from about two to about three hours.

In this step of the reaction an inert atmosphere is not needed. However, an inert atmosphere of argon, nitrogen, and/or helium can be used where desired.

In the process of this invention the bromine used in Step (3) can be added in a pure form or dissolved in one of the hereinbefore-mentioned solvents. It is desirable from the standpoint of high yields to use bromine dissolved in a solvent with the solution being added dropwise to minimize localized bromine concentrations. Where a solvent is used the weight ratio of bromine to solvent can range from about 1:5 to about 1:50, preferably from about 1:10 to about 1:20. Use of a solvent is a preferred embodiment since, as described hereinbefore, excess bromine can oxidize the hydroxyl group resulting in undesired side-products and lower yields.

8(1,2-dibromoethyl)-epi-camphene hydrate is a novel compound and has utility as an intermediate in the process of this invention for the preparation of β-santalol.

Step (4)

In the process of this invention, Step (4) involves the dehydrobromination of the reaction product of Step (3), 8(1,2-dibromoethyl)-epi-camphene hydrate with a strong base to obtain 8-ethynyl-epi-camphene hydrate according to the following:

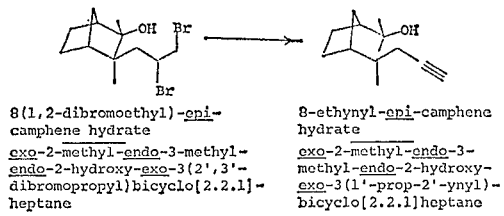

8(1,2-dibromoethyl)-epi-camphene hydrate
exo-2-methyl-endo-3-methyl-endo-2-hydroxy-exo-3(2',3'-dibromopropyl)bicyclo[2.2.1]-heptane 8-ethynyl-epi-camphene hydrate
exo-2-methyl-endo-3-methyl-endo-2-hydroxy-exo-3(1'-prop-2'-ynyl)-bicyclo[2.2.1]heptane In Step (4) of this process the starting material is dehydrobrominated with 2 moles of HBr being removed per mole of starting material. The dehydrobromination is accomplished by the reaction of a strong base, such as sodium amide, lithium amide or potassium amide, with the starting material and results in the formation of the acetylenic alcohol, 8-ethynyl-epi-camphene hydrate. In Step (4) the starting material, 8(1,2-dibromoethyl)-epi-camphene hydrate, is normally used in a molar ratio to the strong base of from about 1:2 to about 1:5, preferably from about 1:2.05 to about 1:3. For high yields it is desirable that a slight excess, e.g., about 1:2.05 to about 1:3, of strong base be used in order to ensure complete dehydrobromination of both moles of HBr from the starting material.

The dehydrobromination of 8(1,2-dibromoethyl)-epi-camphene hydrate is generally run in a solvent. Suitable solvents are aromatic hydrocarbon solvents such as benzene, xylene, and toluene. Hexamethylphosphoramide can also be used effectively as a solvent in this step. Benzene, toluene and hexamethylphosphoramide are preferred. The solvent is generally used in a weight ratio of starting material, 8(1,2-dibromoethyl)-epi-camphene hydrate, to solvent of from about 1:5 to about 1:50, preferably from about 1:10 to about 1:20.

Although the temperature of the reaction can be somewhat dependent upon the reaction conditions, it generally is dependent upon the solvent used. For example, where aromatic hydrocarbon solvents such as benzene, toluene and xylene are used, the reaction normally is run at the reflux temperature of the reaction mixture. Where, however, hexamethylphosphoramide is used, room temperature, e.g., about 25° C., is suitable for this dehydrobromination step.

The time of the reaction again will depend upon the reactant concentrations, and the temperature used (which will be dependent on the solvent used), but generally ranges from about 8 hours to about 24 hours, more normally from about 12 hours to about 16 hours.

In this step of the process an inert atmosphere such as nitrogen, helium or argon, with nitrogen being preferred, is necessary in order to prevent moisture in the air from reacting with the strong base used. The reaction is fairly slow and the use of dilute solutions and dropwise addition of a solution containing one of the reactants is unnecessary but can be used where desired. The two solutions simply are mixed and allowed to stand, with stirring, at the hereinbefore described temperatures for the period of time hereinbefore mentioned.

At the completion of this step of the process of this invention the novel compound, 8-ethynyl-epi-camphene hydrate, is prepared. Where desired this material can be purified by conventional methods, such as distillation or recrystallization. 8-ethynyl-epi-camphene hydrate has a valuable utility as an odorant per se. The compound has a sweet, camphor odor and thus is useful in perfume compositions in which these characteristic notes are desired. The material also is valuable as the starting material in Step (5) of the process of this invention for the preparation of β-santalol.

Step (5)

Step (5) of the process of this invention involves the dehydration of the reaction product of Step (4), 8-ethynyl-epi-caphene hydrate, with a dehydrating agent to form 8-ethynyl-camphene according to the following:

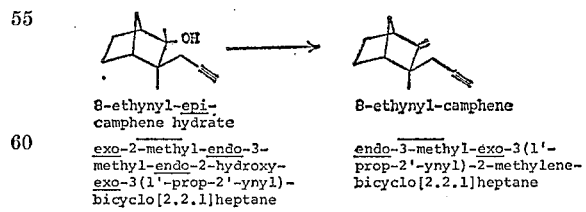

8-ethynyl-epi-camphene hydrate
exo-2-methyl-endo-3-methyl-endo-2-hydroxy-exo-3(1'-prop-2'-ynyl)-bicyclo[2.2.1]heptane 8-ethynyl-camphene
endo-3-methyl-exo-3(1'-prop-2'-ynyl)-2-methylene-bicyclo[2.2.1]heptane Suitable dehydrating reagents for use in Step (5) of the process of this invention are thionyl chloride, phosphorus oxychloride, boron trifluoride, aluminum oxide, sulfuric acid and p-toluene sulfonic acid. Any of these dehydrating agents can be used to transform the hydroxyl group into a methylene group. The dehydrating agents are normally used in a molar ratio of 8-ethynyl-epi-camphene hydrate to dehydrating agent of from about 100:1 to about 1:20, preferably from about 1:1 to about 1:10.

The dehydrating step, Step (5), of the process of this invention is run in an anhydrous solvent. Suitable anhydrous solvents for use with thionyl chloride, phosphorus oxychloride, aluminum oxide, sulfuric acid and p-toluene sulfonic acid are halogenated hydrocarbon solvents, such as carbon tetrachloride, chloroform, methylene chloride, and 1,2-dichloroethane; aromatic hydrocarbon solvents, such as benzene, toluene, and xylene; aliphatic hydrocarbon solvents such as pentane, hexane, heptane, octane, cyclopentane, cyclohexane, and cyclooctane; and ether solvents such as diethyl ether, methylethyl ether, dibutyl ether, tetrahydrofuran, 1,2 - dimethoxyethane, and dioxane. The halogenated hydrocarbon solvents are preferred for use with these dehydrating agents and of these methylene chloride is preferred. The above-mentioned solvents are also suitable for use with boron trifluoride. Where boron trifluoride is used as the dehydrating agent, ether solvents are preferred. Where thionyl chloride is used, pyridine can be used as a solvent or with one of the above solvents. Thionyl chloride is preferred as the dehydrating agent. Thionyl chloride with pyridine is especially preferred. 8-ethynyl-epi-camphene hydrate, is generally used in a weight ratio to the solvent of from about 1:0.5 to about 1:50, preferably from about 1:5 to about 1:20.

The temperature of this step of the reaction will in general be dependent upon the type of dehydrating agent and the solvent used but normally ranges from about $-20°$ C. to about 50° C. With thionyl chloride, phosphorus oxychloride, aluminum oxide, sulfuric acid and p-toluene sulfonic acid, in any of the above-mentioned solvents, the temperature of reaction can range from about $-20°$ C. to about 20° C. With these dehydrating agents it is preferred that the dehydration step be run at about 0° C. for high yields. When boron trifluoride is used in an ether solvent as the dehydrating agent, a higher temperature of from about 25 °C. to about 50° C. (generally the reflux temperature of the boron trifluoride/ether/starting material mixture) is used. Neither the dehydrating agent used nor the solvent employed is a critical consideration in this step of the process and the dehydrating agent and solvent can be selected on the basis of convenience. The time of the reaction generally ranges from about 30 minutes to about three hours, again depending upon the reaction conditions and concentrations used. More normally the reaction time ranges from about one hour to about two hours. The dehydration reaction of Step (5) is usually conducted under an inert atmosphere such as argon, helium, or nitrogen, to prevent the contacting of the dehydrating agent/8-ethynyl-epicamphene hydrate mixture with moisture in the air.

The reaction product 8-ethynyl-camphene of this step of the process of this invention is a novel compound. 8-ethynyl-camphene is valuable as the starting material for use in Step (6) of the process described herein.

Step (6)

In Step (6) of the process of this invention the reaction product of Step (5) is reacted with a compound selected from the group consisting of di(sec-iso-amyl) borane, di(methyl-1-en-9-yl)borane, di(cyclohexyl)borane, and di(iso-butyl)aluminum hydride followed by an alkaline peroxide oxidation to prepare eka-$\beta$-santalal according to the following:

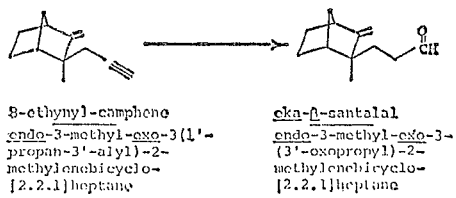

8-ethynyl-camphene
endo-3-methyl-oxo-3(1'-propan-3'-alyl)-2-methylenebicyclo-[2.2.1]heptane eka-$\beta$-santalal
endo-3-methyl-oxo-3-(3'-oxopropyl)-2-methylenebicyclo-[2.2.1]heptane In this step of the reaction the acetylenic olefin, 8-ethynyl-camphene, is transformed into an aldehydic olefin, eka-$\beta$-santalal.

The starting material, 8-ethynyl-camphene, is generally used in a molar ratio to the borane or aluminum compound of from about 1:0.9 to about 1:1.1, more normally at an approximately equimolar ratio, e.g., 1:1.

In this step of the process of this invention an anhydrous solvent is generally used and suitably such solvents are ether solvent such as diethyl ether, dimethyl ether, dibutyl ether, methylethyl ether, tetrahydrofuran, 1,2-dimethoxyethane and dioxane. Tetrahydrofuran is preferred. The starting material, 8-ethynyl-camphene, is generally used in a weight ratio to solvent of from about 1:5 to about 1:100, preferably from about 1:10 to about 1:20.

The temperature used in this step of the process generally is about 0° C., although it can vary from about $-5°$ C. to about 10° C. The reaction normally requires from about one hour to about four hours, more normally from about one to about two hours, of elapsed time for the reaction of the borane or aluminum compound and the starting material, 8-ethynyl-camphene, to reach completion. This step of the reaction is conducted in an inert atmosphere in order to minimize the formation of side products and to ensure that the system remains anhydrous. Suitable inert atmospheres are argon, nitrogen, and helium. Nitrogen and argon are preferred.

Step (6) involves the reaction of 8-ethynyl-camphene with a borane or an aluminum hydride followed by an alkaline peroxide oxidation. The alkaline peroxide oxidation is a standard and well-known procedure. For example, where a borane is used in this step, the step is considered to be a hydroboration and is described in greater detail in H. C. Brown and G. Zweifel, J. Am. Chem. Soc., 83, 1241 (1961); ibid., 83, 3834 (1961). In the alkaline peroxide oxidation a 10% aqueous solution of a base, such as sodium hydroxide, is used in combination with a 30% aqueous solution of hydrogen peroxide. The reaction is quite exothermic and thus the solution of sodium hydroxide and hydrogen peroxide is generally added dropwise and slowly to the reaction mixture. The addition of the alkaline peroxide solution is continued until evolution of oxygen ceases. The alkaline peroxide oxidation as described above is also used when di(iso-butyl) aluminum hydride is used as a reactant in Step (6).

The addition of the alkaline peroxide solution in general results in an instantaneous and vigorous reaction and it is desirable that the temperature be kept as low as possible, e.g., approximately 0° C. Temperatures ranging from about $-20°$ C. to about 10° C. can be used if desired. The reaction time usually is less than ten minutes. The reaction time, however, can range from about five minutes to about one hour depending on reaction conditions. The speed of the reaction is dependent upon the concentration of the reactants, the amounts of alkaline hydrogen peroxide added and the reaction temperature used.

An inert atmosphere, such as nitrogen, argon or helium, is not necessary in the alkaline peroxide oxidation but is generally used since the addition of the borane or aluminum compound to the starting material is conducted in an inert atmosphere.

The product of Step (6) is eka-$\beta$-santalal. Eka-$\beta$-santalal is a novel compound and is useful as a starting material in Step (7) of the process described herein for the preparation of $\beta$-santalol.

Step (7)

Step (7) of the process of this invention involves the reaction of the product of Step (6), eka-$\beta$-santalal, with a phosphorane in a Wittig reaction. The phosphorane used in Step (7) of the process of this invention is (carbethoxyethylidene)triphenylphosphorane having the formula

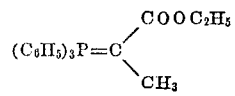

13

The reaction of eka-β-santalal with the above phosphorane results in the formation of a mixture of the cis and trans isomers of ethyl-β-santalate according to the following:

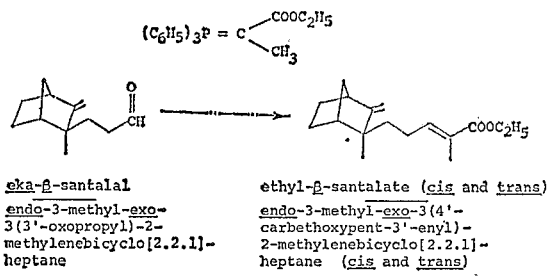

eka-β-santalal
endo-3-methyl-exo-
3(3'-oxopropyl)-2-
methylenebicyclo[2.2.1]-
heptane ethyl-β-santalate (cis and trans)
endo-3-methyl-exo-3(4'-
carbethoxypent-3'-enyl)-
2-methylenebicyclo[2.2.1]-
heptane (cis and trans)

An olefinic double bond is formed in the side-chain of the product of this step of the invention resulting in the formation of both cis-ethyl-β-santalate and trans-ethyl-β-santalate. The cis and trans isomers are shown as follows:

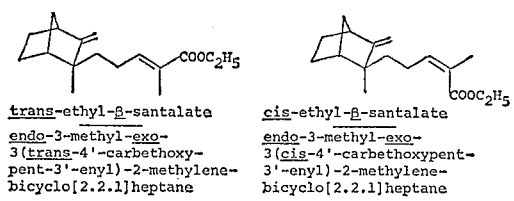

trans-ethyl-β-santalate
endo-3-methyl-exo-
3(trans-4'-carbethoxy-
pent-3'-enyl)-2-methylene-
bicyclo[2.2.1]heptane cis-ethyl-β-santalate
endo-3-methyl-exo-
3(cis-4'-carbethoxypent-
3'-enyl)-2-methylene-
bicyclo[2.2.1]heptane In Step (7) in which the phosphorane is reacted with eka-β-santalal, the reactants are normally used in a molar ratio of eka-β-santalal to phosphorane of from about 1:1 to about 1:5, preferably from about 1:1 to about 1:2. Generally an excess of phosphorane, e.g., 1:2, is used in order to ensure that all of the aldehyde, eka-β-santalal, is converted to the ester, ethyl-β-santalate. The Wittig reaction is a well-known reaction and is described by G. Wittig and U. Schoellkopf, Org. Syn., 40, 66 (1960), and by H. O. House, Modern Synthetic Reactions, pp. 245–256, W. A. Benjamin, Inc., New York (1965).

A solvent is used in Step (7). Suitable solvents are the chlorinated hydrocarbon solvents, such as methylene chloride, chloroform, carbon tetrachloride, and 1,2-dichloroethane; alcohols such as ethanol, methanol, propanol, isopropanol, butanol, and pentanol; polyols such as ethylene glycol, propylene glycol and glycerol; and ether solvents such as dimethyl ether, diethyl ether, methylethyl ether, dibutyl ether, tetrahydrofuran, 1,2-dimethoxyethane, and dioxane. Alcohols are preferred as the solvents for use herein and ethanol is especially preferred. The starting material, eka-β-santalal, is generally used in a weight ratio to solvent of from about 1:2 to about 1:20, preferably from about 1:5 to about 1:10.

The temperature of the reaction can range from about 0° C. to about 50° C. The reaction generally is run at about room temperature, e.g., from about 20° C. to about 30° C. The time of the reaction depends upon the concentration of the reactants and the reaction temperature and generally ranges from about one hour to about 36 hours, more normally from about 12 hours to about 16 hours. Solvent mixtures of the two reactants are simply prepared, poured together, stirred, and allowed to react for the period described above. It is not necessary in this step of the process to use an inert atmosphere, although it may be employed if desired.

As has hereinbefore been described Step (7) of the process of this invention involves the reaction of eka-β-santalal with the phosphorane and results in the formation of an unsaturated ester. The unsaturation gives rise to two geometric isomers, cis-ethyl-β-santalate and trans-ethyl-β-santalate. The mixture of these two isomers has a sweet, spicy odor and is useful as an odorant per se or in perfume compositions. Where desired the cis- and trans-isomers can be separated by conventional methods, e.g., distillation, gas chromatography, or column chromatography, and used separately as odorants per se. The cis- and trans-isomers, separately or as a mixture, prepared as the product of Step (7), also have utility as the starting material in Step (8), the last step of the process of this invention.

Step (8)

The last step of the process of this invention, Step (8), involves the reduction of the mixture of cis- and trans-isomers of ethyl-β-santalate, formed in Step (7), with a reducing agent such as lithium aluminum hydride, sodium in alcohol, potassium in alcohol, and lithium in alcohol. A mixture of cis- and trans-alcohols, cis-β-santalol and trans-β-santalol, is obtained according to the following:

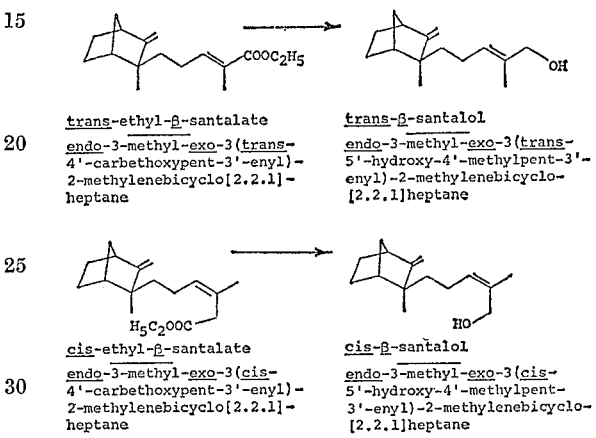

trans-ethyl-β-santalate
endo-3-methyl-exo-3(trans-
4'-carbethoxypent-3'-enyl)-
2-methylenebicyclo[2.2.1]-
heptane trans-β-santalol
endo-3-methyl-exo-3(trans-
5'-hydroxy-4'-methylpent-3'-
enyl)-2-methylenebicyclo-
[2.2.1]heptane cis-ethyl-β-santalate
endo-3-methyl-exo-3(cis-
4'-carbethoxypent-3'-enyl)-
2-methylenebicyclo[2.2.1]-
heptane cis-β-santalol
endo-3-methyl-exo-3(cis-
5'-hydroxy-4'-methylpent-
3'-enyl)-2-methylenebicyclo-
[2.2.1]heptane In Step (8) of the process of this invention the reactants are generally used in equivalent amounts. Since lithium aluminum hydride has four available hydrogens for use in the reduction reaction, the molar ratio of ethyl-β-santalate (cis and trans mixture) to lithium aluminum hydride can range from about 1:0.20 to about 1:0.35. For high yields, it is preferred that a 1:0.25 molar ratio be used. An excess of lithium aluminum hydride is not preferred because the conjugated double bond can be reduced resulting in the formation of side products. Where sodium in alcohol, potassium in alcohol, or lithium in alcohol is used as the reducing agent, the molar ratio of ethyl-β-santalate to reducing agent can range from about 1:1 to about 1:1.5, with equivalent amounts being preferred, e.g., 1:1.

An anhydrous solvent is used in Step (8) of the process of this invention. Where lithium aluminum hydride is used as the reducing agent suitable such solvents are ether solvents, such as diethyl ether, methylethyl ether, dimethyl ether, dibutyl ether, tetrahydrofuran, 1,2-dimethoxyethane, and dioxane; aliphatic hydrocarbon solvents such as pentane, hexane, heptane, octane, cyclopentane, cyclohexane, and cyclooctane; and aromatic hydrocarbon solvents such as benzene, toluene, and xylene. Ether solvents are preferred and tetrahydrofuran is especially preferred. Sodium in alcohol, potassium in alcohol and lithium in alcohol are suitable as reducing agents in this step. Suitable such alcohol solvents for use with these reducing agents are methanol, ethanol, propanol, isopropanol, butanol and pentanol. Methanol and ethanol are preferred. The starting material, ethyl-β-santalate (cis and trans mixture) is generally used in a weight ratio of starting material to solvent of from about 1:5 to about 1:50, preferably from about 1:10 to about 1:20.

The temperature at which the reaction is run can range from about −50° C. to about 20° C., preferably from about −10° C. to about 5° C. The time of the reaction will be dependent upon the reactant concentrations and reaction conditions. The reaction is generally a rapid one requiring from about five minutes to about two hours, more normally from about 30 minutes to about an hour. An inert atmosphere such as argon, nitrogen or helium is also used to protect the reactants from moisture. The order of addition of the reactants is not important. The solution containing the ester mixture, the cis- and trans-ethyl-β-santalates, is generally added to the solution containing the reducing agent, although this is not necessary. Where desired a solution containing the reducing agent can be added to the ester.

β-Santalol obtained by the process of this invention is a mixture of cis-β-santalol and trans-β-santalol. The mixture of trans-β-santalol and cis-β-santalol has an odor characteristic of sandalwood oil and thus is useful in perfume compositions in which the odor characteristics of sandalwood oil are desired. The mixture can be used at a level of from about 0.0001% to about 50% of the perfume composition. The odor characteristics of the santalols are described in the Givaudan Index, pp. 322–323, Givaudan-Delawanna, Inc., New York (1961). The santalols are well known as components of natural sandalwood oil. The mixture is also useful in the reconstitution of natural sandalwood oil.

Where desired, the molar ratio of the two isomers, i.e., the ratio of cis to trans, obtained in the process of this invention can be modified by conventional techniques. In the process of this invention a mixture of isomers is obtained in which the trans isomer of β-santalol is favored over the cis isomer in a ratio of about 1 to about 5. The proportion of the cis isomer to trans isomer in the mixture can be increased to a cis to trans ratio of about 1:1 by irradiation of the cis- and trans-β-santalate ester mixture obtained in Step (7) with ultraviolet light, e.g., with a mercury arc lamp, followed by the reduction step, Step (8). Enrichment in the proportion of the cis isomer is usually accomplished by dissolving the ester mixture in a solvent such as pentane, hexane, heptane, octane, cyclopentane, cyclohexane, and cyclooctane and irradiating the solution. In addition, irradiation of the mixture can be accomplished in an aromatic solvent such as benzene, toluene, or xylene if a Pyrex filter is used. The irradiation of the cis and trans isomer is optional since the product of the process of this invention, the mixture of cis- and trans-β-santalol, is useful as an odorant per se.

The cis and trans isomer mixture, obtained using the process of this invention or as enriched in the cis-isomer as above described, can be separated to obtain either trans-β-santalol or cis-β-santalol. This separation can be easily made by conventional methods, e.g., distillation, gas chromatography, or column chromatography. The isomers individually are useful as perfume components, having a sandalwood odor and can be used in perfume compositions at a level of from about 0.0001% to about 50% of the perfume composition. The utility of the mixture of β-santalol and the cis and trans isomers of β-santalol will be apparent on examination of Examples II, III and IV given hereinafter.

The examples contained herein are merely illustrative of the process of this invention and the utility of the products produced thereby and are not intended to limit the spirit and the scope of this invention.

EXAMPLES

Example I.—Preparation of endo-3-methyl-exo-3(cis-5'-hydroxy - 4' - methylpent-3'-enyl)-2-methylenebicyclo [2.2.1]heptane, cis-β-santalol, and of endo - 3 - methyl-exo-3(trans - 5' - hydroxy - 4' - methylpent - 3' - enyl)-2-methylenebicyclo[2.2.1]heptane, trans-β-santalol General: Melting points were determined on a Thomas-Hoover capillary melting point apparatus or on a micro hot stage and are uncorrected; boiling points are uncorrected. Infrared spectra (I.R.) were recorded on a Perkin-Elmer Infracord spectrophotometer, Nuclear magnetic resonance spectra (N.M.R.) were run as 10% solutions of carbon tetrachloride (unless stated otherwise) on a Varian A–60 or HA–100 spectrometer using tetramethylsilane as an internal reference. Chemical shifts are recorded as parts per million on the τ scale, coupling constants as hertz. Nuclear magnetic resonance data are recorded in the order: chemical shift, multiplicity where s= singlet, q=quartet, d=doublet, t=triplet and m=multiplet (coupling constant), integration (interpretation). Molecular weights were determined on a Bendix Model 12–100 Time-of-Flight mass spectrometer or on an Atlas CH–4 mass spectrometer. The following columns were employed for gas liquid phase chromatography (glpc). Column #1: 10 ft. x 0.25 in. stainless steel column packed with 20% silicone SF 96 coated on 60/80 mesh Chromosorb W–HMDS; Column #2: 10 ft. x 0.25 in. stainless steel column packed with 20% Reoplex-400 coated on 60/80 mesh Chromosorb W–DMCS; Column #3: 10 ft. x 0.25 in. stainless steel column packed with 20% diethylene glycol succinate polymer coated on 60/80 mesh Chromosorb W–HMDS. Retention times are recorded relative to air.

(A) Preparation of 3-methylbicyclo[2.2.1]heptan-2-one (starting material): 2-methylbicyclo[2.2.1]hept-2-ene, as the starting material in the preparation of 3-methylbicyclo[2.2.1]heptan-2-one, was prepared according to the method of K. Alder and H. J. Ache, Chem. Ber., 95, 503 (1962). The condensation of 80 g. of methylcyclopentadiene dimer and a large excess of ethylene afforded 58.0 g. (35.0%) or 2-methylbicyclo[2.2.1]hept-2-ene as a colorless liquid, B.P. 115–117° C. (760 mm.) (spinning band). Gas chromatographic analysis on Column #1 at 85° C. with a helium flow of 60 ml./min. showed 2-methylbicyclo[2.2.1]hept-2-ene (96%).

To a suspension of 34.6 g. (0.202 mole) of m-chloroperbenzoic acid in 200 ml. of methylene chloride initially cooled to 8° C. was added dropwise over a one hour period a solution of 19.0 g. (0.176 mole) of 2-methylbicyclo[2.2.1]hept-2-ene, prepared as above, in 100 ml. of methylene chloride. The temperature during the addition rose to 20° C. The reaction was stirred an additional 16 hours at 23–26° C., then diluted with 350 ml. of diethyl ether. The organic layer was washed with 10% sodium hydroxide (6 times with 100 ml.) solution, water (2 times with 100 ml.), saturated ferrous sulfate solution (100 ml.), water (3 times with 150 ml.) and dried over magnesium sulfate. Evaporation of the solvents yielded 20.3 g. of a colorless liquid. Distillation from a Kontes short-path column gave 8.32 g. of a colorless liquid, B.P. 95° C. (100 mm). Gas chromatographic analysis on Column #2 at 125° C. with a helium flow of 60 ml./min. showed the presence of endo-2-methyl-exo - 2,3 - epoxybicyclo[2.2.1]heptane, relative retention time 9.25 min.

A solution of 5.0 g. (0.04 mole) of endo-2-methyl-exo-2,3-epoxybicyclo[2.2.1]heptane in 500 ml. of diethyl ether containing 2 ml. of boron trifluoride was stirred at 26° C., under a nitrogen blanket, for 17 hours. Ice water (25 ml.) was added dropwise over a 20 min. period. The layers were separated and the ethereal layer was washed with water (2 times with 100 ml.). The ethereal layer was dried over magnesium sulfate and the ether evaporated to yield 4.0 g. of a light yellow liquid. This liquid was dissolved in 10 ml. of hexane (B.P. 67° C.) and adsorbed on 20.0 g. of Woelm Activity 1 neutral alumina. Elution with 400 ml. of hexane gave 3.2 g. of a colorless liquid. Distillation from a Kontes short-path column yielded 2.2 g. (44%) of a colorless liquid, B.P. 56–58° C. (5 mm.). Glpc analysis on Column #1 at 125° C. with a helium flow of 60 ml./min. showed endo-3-methylbicyclo[2.2.1]heptan-2-one (80%), relative retention time 9 min., 55 sec. The physical constants of a sample of endo-3-methylbicyclo[2.2.1]heptan-2-one collected by preparative glpc under the above conditions were consistent with the reported literature values. The infrared showed $\lambda^{neat}$ 5.73μ (C=O); N.M.R. (10% CCl$_4$); τ 9.01 and 9.08, d, J=7.0 Hz. (endo-methyl protons).

(B) Preparation of endo-3-methyl-exo-3(1'-prop-2'-enyl)bicyclo[2.2.1]heptan-2-one—Step (1): A suspension containing 14.4 g. (0.37 mole) of sodium amide in 100 ml. of tetrahydrofuran (anhydrous) was prepared and added dropwise over a 30 minute period to a solution of 37.6 g. (0.30 mole) of endo-3-methylbicyclo[2.2.1]heptan-2-one prepared above in 50 ml. of tetrahydrofuran. The dropping funnel was replaced by a gas inlet tube and the ammonia expelled by bubbling nitrogen through the reaction mixture at 66° C. for three hours. The reaction mixture was cooled (26° C.) and the excess sodium amide allowed to settle. The turbid liquors were decanted under a nitrogen atmosphere. This suspension was heated (66° C.) under a nitrogen atmosphere and 151.6 g. (1.24 moles) of allyl bromide was added dropwise over a 1.5 hour period. This mixture was heated at reflux (66° C.) for an additional 16 hours, cooled (26° C.) and 100 ml. of water was added dropwise. The layers were separated and the organic layer washed with water (3 times with 50 ml.) and dried over magnesium sulfate. The tetrahydrofuran (B.P. 66° C.) and the excess allyl bromide (69–71° C.) was distilled from the reaction mixture and the residue diluted with 150 ml. of ether. The ethereal solution was washed with water (3 times with 50 ml.) and dried over magnesium sulfate. Evaporation of ether afforded 48.5 g. of a light brown liquid. Distillation from a Kontes short-path column yielded 39.7 g. (80%) of endo-3-methyl-exo-3(1'-prop - 2' - enyl)bicyclo[2.2.1]heptan-2-one as a colorless liquid, B.P. 83–84° C. (4 mm.). Gas chromatographic analysis on Column #1 at 154° C. with a helium flow of 78 ml./min. showed endo-3-methyl-exo-3(1'-prop-2'-enyl)bicyclo[2.2.1]heptan-2-one (96%), relative retention time 7.66 min. A sample collected by preparative gas liquid phase chromatography under the above conditions showed: infrared $\lambda^{neat}$ 5.75$\mu$ (C=O), 6.1 and 11.0$\mu$ (terminal olefin); N.M.R: (10% CCl$_4$) $\tau$ 4.1–4.5, m, 1H (internal vinyl proton); $\tau$ 4.9–5.2, m, 2H (terminal vinyl protons); $\tau$ 7.5 and 7.7, 2H (bridgehead protons); $\tau$ 7.9, d, (J=8.0 Hz.), 2H (allyl protons); $\tau$ 9.09, s, 3H (endo-methyl protons).

*Analysis.*—Calcd. for C$_{11}$H$_{16}$O (percent): C, 80.4; H, 9.8. Found: (percent): C, 80.4; H, 9.8.

When in Step (1) above other strong bases, such as trityl sodium, trityl potassium, trityl lithium, sodium hydride, potassium hydride, lithium hydride, potassium amide and lithium amide, are substituted on an equivalent basis for the sodium amide used, substantially similar results are obtained in that endo-3-methyl-exo-3(1'-prop-2'-enyl)bicyclo[2.2.1]heptan-2-one is prepared.

When in Step (1) above other allyl halides, such as allyl chloride or allyl iodide, are substituted on an equivalent basis for the allyl bromide used, substantially similar results are obtained in that endo-3-methyl-exo-3(1'-prop-2'-enyl)bicyclo[2.2.1]heptan-2-one is prepared.

When in Step (1) above other anhydrous solvents, e.g., aromatic hydrocarbon solvents such as toluene, xylene and benzene; ether solvents such as diethyl ether, dimethyl ether, methylethyl ether, dibutyl ether, 1,2-dimethoxyethane, and dioxane; and aliphatic hydrocarbon solvents such as pentane, hexane, heptane, octane, cyclopentane, cyclohexane, and cyclooctane; are substituted on an equivalent basis for the tetrahydrofuran used, substantially similar results are obtained in that endo-3-methyl-exo-3(1'-prop-2'-enyl)bicyclo[2.2.1]heptan-2-one is prepared.

When in Step (1) above exo-3-methylbicyclo[2.2.1]heptan-2-one or a mixture of exo-3-methylbicyclo[2.2.1]heptan-2-one and endo-3-methylbicyclo[2.2.1]heptan-2-one (e.g., in a 1:1, 2:1 or 1:2 ratio) is substituted on an equivalent basis for the endo-3-methylbicyclo[2.2.1]heptan-2-one used above, substantially similar results are obtained in that endo-3-methyl-exo-3(1'-prop-2'-enyl)micyclo[2.2.1]heptan-2-one is prepared.

(C) Preparation of exo-2-methyl-endo-3-methyl-endo-2-hydroxy-exo - 3(1' - prop-2' - enyl)bicyclo[2.2.1]heptane—Step (2): Over a one hour period 200 ml. (7.3 g., 0.333 mole) of a 1.67 molar solution of methyllithium in diethyl ether was added dropwise to a solution of 18.0 g. (0.109 mole) of endo-3-methyl-exo-3(1'-prop-2'-enyl) bicyclo[2.2.1]heptan-2-one in 25 ml. of ether under a nitrogen atmosphere. The reaction mixture was stirred for an additional 3 hours at 26° C. After cooling to 0° C. the excess methyllithium was destroyed by the dropwise addition of 20 ml. of ice water. The ether layer was separated, washed with water and dried over magnesium sulfate. Evaporation of the ether yielded 19.5 g. of a colorless liquid. Distillation from a Kontes short-path column gave 15.6 g. (81%) of exo-2-methyl-endo-3-methyl-endo-2-hydroxy-exo-3(1'-prop-2'-enyl)bicyclo[2.2.1]heptane, a colorless liquid, B.P. 75–76° C./0.7 mm. Gas chromatographic analysis on Column #1 at 160° C. with a helium flow of 60 ml./min. showed exo-2-methyl-endo-3-methyl-endo-2-hydroxy-exo-3(1'-prop - 2' - enyl)bicyclo[2.2.1]heptane (86%), relative retention time 10 minutes. A sample collected by preparative glpc under the above conditions showed: N.M.R. (10% in CCl$_4$); $\tau$ 4.1–4.5, m, 1H (internal vinyl proton); $\tau$ 4.9–5.2, m, 2H (terminal vinyl proton); $\tau$ 7.98, d (J=8.0 Hz.), 2H (allyl protons); $\tau$ 8.85, s, 3H (C–2-exo-methyl protons); $\tau$ 9.18, s, 3H (C–3-endo-methyl protons); $\tau$ 8.0–9.0, 9H (bridgehead protons, hydroxyl proton and the C–5, C–6, C–7 methylene protons overlapping with the C–2, C–3 methyl protons and the allyl protons); infrared; $\lambda^{neat}$ 2.9$\mu$ (OH), 6.1 and 11.0$\mu$ (terminal olefin).

*Analysis.*—Calcd. for C$_{12}$H$_{20}$O (percent): C, 80.0; H, 11.2. Found (percent): C, 79.6; H, 11.2.

When in Step (2) above methylmagnesium bromide is substituted on an equivalent basis for the methyllithium used above, substantially similar results are obtained in that exo-2-methyl-endo - 3 - methyl-endo-2-hydroxy-exo-3(1'-prop-2'-enyl)bicyclo[2.2.1]heptane is prepared.

When in Step (2) above other anhydrous solvents, e.g., ether solvents such as dimethyl ether, methylethyl ether, dibutyl ether, 1,2-dimethoxyethane tetrahydrofuran and dioxane; aromatic hydrocarbon solvents, such as benzene, toluene, and xylene; and aliphatic hydrocarbon solvents such as pentane, hexane, heptane, octane, cyclopentane, cyclohexane, and cyclooctane; are substituted on an equivalent basis for the diethyl ether used above, substantially similar results are obtained in that exo-2-methyl-endo-3-methyl-endo - 2 - hydroxy-exo-3(1'-prop-2'-enyl)-bicyclo[2.2.1]heptane is prepared.

(D) Preparation of exo-2-methyl-endo-3-methyl-endo-2 - hydroxy - exo-3(2',3'-dibromopropyl)bicyclo-[2.2.1]heptane—Step (3): To a solution of 17.0 g. (0.0945 mole) of the reaction product obtained from Step (2) in 30 ml. of carbon tetrachloride cooled to −2° C. was added dropwise over a 3 hour period a solution of 19.5 g. (0.123 mole) of bromine in 30 ml. of carbon tetrachloride. The reaction was stirred an additional 0.5 hour, diluted with 200 ml. of ether and poured into 300 ml. of saturated sodium carbonate solution. The organic layer was separated and washed with saturated sodium carbonate solution (2 times with 100 ml.) and water (3 times with 50 ml.). After drying over magnesium sulfate the solvents were evaporated to yield 30.0 g. of a heavy brown liquid that partially crystallized on standing. Infrared analysis of this material showed absence of olefin bands at 6.1 and 11.0$\mu$. This material, exo - 2-methyl-endo-3-methyl-endo-2-hydroxy-exo - 3(2',3'-dibromopropyl)bicyclo[2.2.1]heptane, was used in subsequent steps in the process without further purification.

When in Step (3) above other solvents, e.g., chlorinated hydrocarbons, such as methylene chloride, chloroform, and 1,2-dichloroethane; and aliphatic hydrocarbon solvents, such as pentane, hexane, heptane, octane, cyclopentane, cyclohexane, and cyclooctane; are substituted on an equivalent basis for the carbon tetrachloride used above, substantially similar results are obtained in that exo-2-methyl-endo-3-methyl-endo-2-hydroxy-exo - 3(2',3'-dibromopropyl)bicyclo[2.2.1]heptane is prepared.

When in Step (3) above pure bromine is substituted on an equivalent basis for the bromine dissolved in carbon tetrachloride used above, substantially equivalent resalts are obtained in that exo-2-methyl-endo-3-methyl-endo - 2 - hydroxy - exo-3(2′,3′-dibromopropyl)bicyclo [2.2.1]heptane is prepared.

(E) Preparation of exo-2-methyl-endo-3-methyl-endo-2-hydroxy-exo-3(1′-prop-2′-ynyl)bicyclo[2.2.1]-heptane—Step (4): To a suspension of 2.05 g. (0.053 mole) of sodium amide in 30 ml. of benzene was added a solution of 3.0 g. (0.0088 mole) of the reaction product of Step (3) in 45 ml. of benzene and this mixture heated to reflux (80° C.), under a nitrogen atmosphere, for 16 hours. After cooling (0° C.) the excess sodium amide was destroyed by the dropwise addition of 100 ml. of ice water. The mixture was acidified (pH 5.0) with concentrated hydrochloric acid (12 M) and diluted with 300 ml. of ether. The organic layer was separated, washed with water (3 times with 100 ml.) and dried over magnesium sulfate. Evaporation of the solvents yielded 1.72 g. of a yellow liquid. Distillation from a modified Hickman still afforded 1.4 g. of a colorless liquid, B.P. 84–105° C., at 0.5 mm. Gas chromatographic analysis on Column #1 at 200° C. with a helium flow of 60 ml./min. showed the presence of exo-2-methyl-endo-3-methyl-endo-2-hydroxy-exo - 3(1′ - prop-2′-ynyl)bicyclo[2.2.1] - heptane (41%), relative retention time 2.3 min. A sample of exo-2-methyl - endo-3-methyl-endo-2-hydroxy-exo-3(1′-prop-2′-ynyl) bicyclo[2.2.1]heptane was collected by preparative glpc under the above conditions and showed M.P. 54.5–55.5° C.; infrared: $\lambda^{CCl_4}$ 2.8–2.9 and 9.35$\mu$ (OH); $\lambda$3.05$\mu$ (C≡CH); $\tau$ 4.75$\mu$ (C≡C); N.M.R. (10% in CCl$_4$) $\tau$ 7.75, d, $J$=2.5 Hz. (acetylenic proton overlapping with the bridgehead protons); $\tau$ 8.67, s (exo-methyl protons); $\tau$ 8.85, s (endo-methyl protons).

*Analysis.*—Calcd. for C$_{12}$H$_{18}$O (percent): C, 81.0; H, 10.1. Found (percent): C, 81.1; H, 10.3.

When in Step (4) above other solvents, e.g., aromatic hydrocarbon solvents, such as xylene, and toluene; are substituted on an equivalent basis for the benzene used above or when hexamethylphosphoramide is substituted on an equivalent basis for the benzene used above and the temperature is lowered from 80° C. to room temperature (e.g., 25° C.), substantially similar results are obtained in that exo-2-methyl-endo-3-methyl-endo-2-hydroxy-exo-3(1′-prop-2′-ynyl)-bicyclo[2.2.1]heptane is prepared.

When in Step (4) above, potassium amide or lithium amide is substituted on an equivalent basis for the sodium amide used above, substantially similar results are obtained in that exo - 2-methyl-endo-3-methyl-endo-2-hydroxy - exo - 3(1′-prop-2′-ynyl)bicyclo[2.2.1]heptane is prepared.

(F) Preparation of endo - 3-methyl-exo-3(1′-prop-2′-ynyl)2-methylenebicyclo[2.2.1]heptane—Step (5): To a solution of 8.25 g. (0.046 mole) of the reaction product of Step (4) in 100 ml. of methylene chloride, under a nitrogen atmosphere and cooled to 0° C., was added dropwise over a one hour period a solution of 30.0 g. (0.254 mole) of thionyl chloride and 20.0 g. (0.252 mole) of pyridine. The reaction mixture was stirred an additional 30 minutes at 0–5° C., diluted with hexane (100 ml.) and the excess thionyl chloride destroyed by the dropwise addition of 200 ml. of ice water. The organic layer was separated, washed with water (3 times with 50 ml.), and dried over magnesium sulfate. The solvents were evaporated and the residue diluted with 25 ml. of pyridine. The solution was heated at 115.5° C. for 3 hrs. After cooling, the reaction mixture was diluted with 220 ml. of ether. The ethereal layer was washed with cold 10% hydrochloric acid, water, 30 ml. of saturated sodium carbonate solution, water (3 times with 50 ml.), and dried over magnesium sulfate. Evaporation of the ether afforded 5.1 g. of a light yellow liquid. Distillation from a Kontes short-path column yielded 3.05 g. (41%) of a colorless liquid, B.P. 74° C. (5.0 mm.). Gas chromatographic analysis on Column #1 at 150° C. with a helium flow of 60 ml./ min. showed the presence of endo-3-methyl-exo-3(1′-prop-2′-ynyl)-2-methylenebicyclo[2.2.1]heptane (96%), relative retention time 6.5 min. The infrared spectrum showed: $\lambda^{neat}$ 3.04$\mu$ (C≡C—H); $\lambda$ 4.75 (C≡C); $\lambda$ 6.05 and 11.32$\mu$ (C=CH$_2$). The N.M.R. spectrum was consistent with the assigned structure (10% in CCl$_4$), $\tau$ 5.23, s and $\tau$ 5.43, s, 2H (vinyl protons; $\tau$ 7.29, s, and $\tau$ 7.63, s, 2H (bridgehead protons); $\tau$ 7.79, d, $J$=2.5 Hz., 1H (acetylenic protons); $\tau$ 7.88, d, $J$=2.5 Hz., 2H (propargylic protons); $\tau$ 8.77, s, 3H (endo-methyl protons).

*Analysis.*—Calcd. C$_{12}$H$_{16}$ (percent): C, 89.9; H, 10.3. Found (percent): C, 89.5; H, 10.1.

When in Step (5) above other dehydrating agents, such as phosphorus oxychloride, aluminum oxide, sulfuric acid, and p-toluene sulfonic acid, are substituted on an equivalent basis for the thionyl chloride used above, and when in Step (5) above other anhydrous solvents, e.g., halogenated hydrocarbon solvents such as carbon tetrachloride, chloroform, and 1,2-dichloroethane; aromatic hydrocarbon solvents such as benzene, toluene, and xylene; aliphatic hydrocarbon solvents, such as pentane, hexane, heptane, octane, cyclopentane, cyclohexane, and cyclooctane; and ether solvents such as diethyl ether, dimethyl ether, methylethyl ether, dibutyl ether, tetrahydrofuran, 1,2-dimethoxyethane, and dioxane; are substituted on an equivalent basis for the methylene chloride used above, substantially similar results are obtained in that endo-3-methyl-exo-3(1′-prop-2′-ynyl)2 - methylenebicyclo[2.2.1] heptane is prepared.

When in Step (5) above boron trifluoride, in ether solvents such as diethyl ether, dimethyl ether, methylethyl ether, dibutyl ether, tetrahydrofuran, 1,2-dimethoxyethane, and dioxane, is substituted on an equivalent basis for the thionyl chloride used above and the reaction temperature increased to 25° C., substantially similar results are obtained in that endo-3-methyl-exo-3(1′-prop-2′-ynyl)2-methylenebicyclo[2.2.1]heptane is prepared.

(G) Preparation of endo-3-methyl-exo-3(3′-oxopropyl 3′-alyl)-2-methylenebicyclo[2.2.1]heptane—Step (6): To a solution of 1.117 g. (6.9×10$^{-3}$ mole) of the reaction product of Step (5) in 30 ml. of tetrahydrofuran (freshly distilled from lithium aluminum hydride) cooled to 0° C. and under a nitrogen atmosphere was added dropwise over a 30 min. period 1.39 g. (9 ml.) of 1 M solution (9.1×10$^{-3}$ mole) of di(sec-iso-amyl)borane in tetrahydrofuran. The reaction was stirred an additional 20 minutes at 0–4° C. and the ice bath removed and the reaction allowed to stir at ambient temperature (approximately 25° C.) for 1.75 hours. The reaction mixture was recooled to 0° C. and 2 ml. of 10% sodium hydroxide followed by 2 ml. of 30% hydrogen peroxide was added dropwise over a 10 minute period. This additional process was repeated three times. The temperature during the addition rose to 16° C. After the additions the ice bath was removed and the reaction mixture stirred at ambient temperature, e.g., about 25° C., for 30 minutes. This mixture was diluted with hexane (200 ml.) and washed in turn with water (100 ml.), 10% sodium hydroxide (2 times with 50 ml.), water (100 ml.), saturated ferrous sulfate solution (2 times with 100 ml.), water (4 times with 100 ml.), and dried over magnesium sulfate. Evaporation of the hexane yielded 1.09 g. of a colorless liquid. Gas chromatographic analysis of this crude mixture on Column #1 at 175° C. with a helium flow of 60 ml./ min. showed the presence of endo-3-methyl-exo-3(3′-oxopropyl)-2-methylenebicyclo[2.2.1]heptane (61%), relative retention time 7.5 minutes. A sample collected by preparative glpc under the above conditions showed the following: infrared: $\lambda^{CCl_4}$ 3.71 and 5.81$\mu$ (aldehyde); $\lambda$ 6.10 and 11.34$\mu$ (terminal olefin); N.M.R.: (10% CDCl$_3$); $\tau$ 0.3, t ($J$=2 Hz.), 1H (aldehydic proton); $\tau$ 8.95, s (endo-methyl protons). This crude mixture was used in Step (7) below.

When in Step (6) above other dialkyl boranes, e.g., di(methyl-1-en-9-yl)borane and di(cyclohexyl)borane or when in Step (6) above di(iso-butyl)aluminum hydride is substituted on an equivalent basis for the di(sec-iso-amyl) borane used above, substantially similar results are obtain in that endo-3-methyl-exo-3(3'-oxopropyl)-2-methylenebicyclo[2.2.1]heptane is prepared.

When in Step (6) above other anhydrous ether solvents, such as diethyl ether, dibutyl ether, methylethyl ether, dimethyl ether, 1,2-dimethoxyethane and dioxane, are substituted on an equivalent basis for the tetrahydrofuran used above, substantially equivalent results are obtained in that endo-3-methyl-exo-3(3'-oxopropyl)-2-methylene-bicyclo[2.2.1]heptane is obtained.

(H) Preparation of cis- and trans-endo-3-methyl-exo-3 (4'-carbethoxypent-3'-enyl)-2-methylene - bicyclo[2.2.1] heptane—Step (7): To a suspension of 3.7 g. ($1.01 \times 10^{-2}$ mole) of (carbethoxyethylidene)triphenyl phosphorane in 200 ml. of ethanol was added a solution of 1.0 g. of the crude reaction mixture, obtained from Step (6) above, in 10 ml. of ethanol. After a short period the reaction mixture became homogeneous and stirring was continued for 16 hours at 27° C. The ethanol was evaporated and the yellowish semi-solid residue triturated with warm water (60° C., 3 times with 75 ml.) and the water washings discarded. The residual waxy liquid was triturated with hexane (3 times with 75 ml.). The hexane washings were combined, washed with water (2 times with 50 ml.) and dried over magnesium sulfate. Evaporation of the hexane yielded 1.2 g. of a yellow liquid. This liquid was dissolved in hexane (10 ml.) and adsorbed on a chromatography column packed with 15 g. of Woelm neutral alumina. Elution with 600 ml. of hexane afforded 521 mg. of a light yellow liquid. Distillation in a modified Hickman still afforded 267 mg. of a colorless liquid, B.P. 110–120° C. (0.25 mm.). Gas chromatographic analysis on Column #1 at 200° C. with a helium flow of 60 ml./min. showed endo-3-methyl-exo-3(cis-4'-carbethoxypent - 3' - enyl)-2-methylenebicyclo[2.2.1]heptane (9.4%), relative retention time 15.85 minutes, and endo-3-methyl-exo-3(trans-4'-carbethoxypent-3'-enyl) - 2 - methylene-bicyclo[2.2.1] heptane (45.3%), relative retention time 22 minutes.

A sample of the cis-ester collected by preparative glpc showed the following: infrared: $\lambda^{CH_2Cl_2}$ 5.89$\mu$ (unsaturated ester carbonyl); $\lambda$ 6.08 and 11.35$\mu$ (terminal olefin); N.M.R. (10% in CCl$_4$): $\tau$ 4.28, t, $J=6.0$ Hz., 1H (internal vinyl proton); $\tau$ 5.30, s, 1H and 5.55, s, 1H (terminal vinyl protons); $\tau$ 5.98, q, $J=7.0$ Hz., 2H and $\tau$ 8.75, t, $J=7.0$ Hz., 3H (ethyl ester protons); $\tau$ 7.3, s-broad (allyl bridgehead proton); $\tau$ 7.55, q, $J=7.0$ Hz., 2H (allyl protons); $\tau$ 7.80, s-broad, 1H (bridgehead proton); $\tau$ 8.2, s (vinyl methyl protons); $\tau$ 8.98, s (endo-methyl protons).

*Analysis.*—Calcd. for C$_{17}$H$_{26}$O$_2$ (percent): C, 77.9; H, 10.0. Found (percent): C, 77.8; H, 10.1.

A sample of the trans-ester obtained in the same manner showed the following: infrared spectrum: $\lambda^{CH_2Cl_2}$ 5.89$\mu$ (unsaturated ester carbonyl); 6.08 and 11.35$\mu$ (terminal olefin); N.M.R. (10% in CCl$_4$): $\tau$ 3.46, t, $J=8.0$ Hz., 1H (internal vinyl proton); $\tau$ 5.35, s, OH and $\tau$ 5.62, s, 1H (terminal vinyl protons); $\tau$ 5.89, q, $J=7.0$ Hz., 2H and $\tau$ 8.75, t, $J=7.0$ Hz., 3H (ethyl ester protons); $\tau$ 7.39, s-broad, 1H (allyl bridgehead proton); $\tau$ 7.9, m overlapping with the bridgehead proton, 2H (allyl protons); $\tau$ 8.26, s (endo-ethyl protons).

*Analysis.*—Calcd. for C$_{17}$H$_{26}$O$_2$ (percent): C, 77.9; H, 10.0. Found (percent): C, 77.4; H, 10.0.

When in Step (7) above other solvents, e.g., chlorinated hydrocarbons, such as methylene chloride, chloroform, carbon tetrachloride, and 1,2-dichloroethane; alcohols, such as methanol, propanol, iso-propanol, butanol and pentanol; polyols such as ethylene glycol, propylene glycol and glycerol; and ether solvents, such as diethyl ether, methylethyl ether, dibutyl ether, dimethyl ether, tetrahydrofuran, 1,2-dimethoxyethane, and dioxane are substituted on an equivalent basis for the ethanol used above, substantially similar results are obtained in that cis- and trans- endo-3-methyl-exo-3(4'-carbethoxypent-3'-enyl)-2-methylenebicyclo[2.2.1]heptane are prepared.

The crude ester mixture, after column chromatography can be purified further by saponification with base, e.g., sodium hydroxide, to the acids. In this manner the neutral impurities can be removed and the methyl esters regenerated by esterification with ethereal diazomethane. The ratio (1:4.8) of cis- to trans-esters obtained in this manner can be altered to a ratio of (1:1.8) according to the following procedure: an oxygen-free solution of 550 mg. of the ester mixture (ratio cis- to trans-1:4.8) obtained as above in 200 ml. of toluene is irradiated in a nitrogen atmosphere with a 450-watt Hanovia mercury arc lamp using a Pyrex filter for 24 hours. The toluene is evaporated and the residual light yellow liquid distilled in a modified Hickman still to yield 185 mg. of a colorless liquid, B.P. 110–120° C. (0.25 mm.). Gas chromatographic analysis on Column #3 at 200° C. with a helium flow of 60 ml./min. showed the cis-ester, relative retention time 6.85 min. and the trans-ester relative retention time 11 minutes, in the ratio 1:1.8.

The modification of the cis/trans ratio in the product obtained in Step (7) above can also be performed in aliphatic hydrocarbon solvents, such as pentane, hexane, heptane, octane, cyclohexane, and cyclooctane, without using a Pyrex filter. A sample of the product mixture having a cis/trans ratio of 1:4.8 was irradiated for 20 minutes with a 450-watt Hanovia mercury arc lamp and was converted to a product mixture having a cis/trans ratio of 1:1.1.

(I) Preparation of endo-3-methyl-exo-3(cis-5'-hydroxy-4'-methylpent - 3' - enyl)-2-methylenebicyclo[2.2.1]heptane, cis-$\beta$-santalol, and endo-3-methyl-exo-3(trans-5'-hydroxy-4'-methylpent-3'-enyl)-2 - methylenebicyclo[2.2.1] heptane, trans-$\beta$-santalol—Step (8): To a stirred suspension of 136 mg. ($3.6 \times 10^{-3}$ mole) of lithium aluminum hydride in 200 ml. of anhydrous diethyl ether at 0° C. and under a nitrogen atmosphere was added dropwise over a 35 min. period a solution of 670 mg. ($2.7 \times 10^{-3}$ mole) of the ester mixture obtained as the reaction product of Step (7) above (after irradiation) in 20 ml. of ether. The reaction mixture was stirred for an additional 30 min. and then the excess lithium aluminum hydride was destroyed by the dropwise addition of 10 ml. of ice water. An additional 50 ml. of ether was added and the layers separated. The ethereal layer was washed with water (50 ml.), saturated ammonium chloride solution (50 ml.), and dried over magnesium sulfate. Evaporation of the ether afforded 300 mg. of a light yellow liquid. Distillation from a modified Hickman still afforded 213 mg. of a colorless liquid, B.P. 100–110° C. (0.01 mm.). Gas chromatographic analysis on Column #2 at 220° C. with a helium flow of 100 ml./min. showed the presence of endo - 3 - methyl-exo-3(cis-5'-hydroxy-4'-methylpent - 3' - enyl)-2-methylenebicyclo[2.2.1]heptane, cis-$\beta$-santalol (24.1%), relative retention time 17 min. and endo-3-methyl-exo - 3 - (trans-5'-hydroxy-4'-methylpent-3' - enyl) - 2 - methylenebicyclo[2.2.1]heptane, trans-$\beta$-santalol (42.8%), relative retention time 18.66 minutes.

A sample of cis-$\beta$-santalol collected by preparative glpc under these conditions showed: infrared spectrum: $\lambda^{film}$ 2.93–3.1$\mu$ (OH) and 6.08 and 11.4$\mu$ (exo-cyclic olefin); N.M.R. (10% in CCl$_4$); $\tau$ 4.6–4.9, m, 1H (internal vinyl proton); $\tau$ 5.37, s, 1H and $\tau$ 5.6, s, 1H (terminal vinyl protons); $\tau$ 6.0, s, 2H (allyl-CH$_2$-OH protons); $\tau$ 7.39, s-broad, 1H (allyl bridgehead proton); $\tau$ 7.8–8.1, m, 3H (bridgehead proton overlapping with the allyl protons); $\tau$ 8.26, s (vinyl methyl protons); $\tau$ 8.95, s (endo-methyl protons).

*Analysis.*—Calcd. for C$_{15}$H$_{24}$O (percent): C, 81.8; H, 10.9. Found (percent): C, 81.7; H, 11.3.

A sample of trans-$\beta$-santalol collected by preparative glpc in this manner had the following spectral data: infrared spectrum: $\lambda^{film}$ 2.9–3.1$\mu$ (OH) and 6.08 and 11.4$\mu$ (exo-cyclic olefin); N.M.R. (10% CCl$_4$); $\tau$ 4.6–4.9, m, 1H (internal vinyl proton); τ 5.37, s, 1H and τ 5.61, s, 1H (terminal vinyl protons); τ 6.20, s, 2H (allyl-$CH_2$-OH); τ 7.40, s-broad, 1H (allyl bridgehead proton); τ 7.8–8.0, m (bridgehead proton overlapping with the allyl protons); τ 8.4, s (vinyl methyl protons); τ 8.95, s (endo-methyl protons).

*Analysis.*—Calcd. for $C_{15}H_{24}O$ (percent): C, 81.8; H, 10.9. Found (percent): C, 81.4; H, 10.9.

When in Step (8) above other anhydrous solvents, e.g., ether solvents, such as dimethyl ether, methylethyl ether, dibutyl ether, tetrahydrofuran, 1,2-dimethoxy ethane, and dioxane; aliphatic hydrocarbon solvents, such as pentane, hexane, heptane, octane, cyclopentane, cyclohexane, and cyclooctane; and aromatic hydrocarbon solvents such as benzene, toluene, and xylene; are substituted on an equivalent basis for the diethyl ether used above, substantially similar results are obtained in that endo-3-methyl-exo - 3(cis-5'-hydroxy-4' - methylpent-3'-enyl)-2 - methylenebicyclo[2.2.1]heptane and endo-3-methyl-exo-3-(trans-5'-hydroxy - 4' - methylpent-3'-enyl)-2-methylene-bicyclo[2.2.1]heptane are prepared.

When in Step (8) above sodium, lithium, or potassium, is substituted on an equivalent basis for the lithium aluminum hydride used above and when alcohol solvents such as methanol, ethanol, propanol, iso-propanol, butanol, and pentanol, are substituted on an equivalent basis for the diethyl ether used above, substantially similar results are obtained in that endo-3-methyl-exo-3(cis-5' - hydroxy - 4' - methylpent-3'-enyl)-2methylenebicyclo[2.2.1]heptane and endo-3-methyl - exo-3(trans-5'-hydroxy-4'-methylpent-3'-enyl) - 2-methylenebicyclo[2.2.1] heptane are obtained.

Example II.—Perfume compositions

Perfume compositions containing mixtures of the cis and trans isomers of β-santalol and containing cis-β-santalol and trans-β-santalol are prepared by intermixing the components shown below. The compositions exhibit highly desirable and useful odors.

COMPOSITION
Sandal

| | |
|---|---|
| Mixture of cis- and trans-β-santalol [1] | 40.0 |
| Geranium bourbon | 15.0 |
| Vetivert | 3.0 |
| Patchouli | 1.0 |
| Olibanum | 1.0 |
| Coumarin | 2.5 |
| Citronellol | 15.0 |
| Phenyl ethyl alcohol | 7.5 |
| Musk xylol | 0.6 |
| Musk ambrette | 0.4 |
| Peru balsam | 4.0 |
| Ambre synthetic | 3.5 |
| Cassia | 1.0 |
| Cinnamic alcohol | 0.5 |
| Jasmine synthetic | 1.5 |
| Ionone α | 3.5 |
| | 100.0 |

[1] A mixture of the cis- and trans-isomers of β-santalol in a ratio of 1:4.8.

COMPOSITION B
Rose de chine

| | |
|---|---|
| Geranium bourbon | 20 |
| Geraniol | 30 |
| Rose Otto synthetic | 4 |
| Cis-β-santalol | 3 |
| Patchouli | 8 |
| Cedarwood | 8 |
| Musk xylol | 6 |
| Terpineol | 15 |
| Phenyl ethyl alcohol | 6 |
| | 100 |

COMPOSITION C
Chypre

| | |
|---|---|
| Oakmoss | 2.0 |
| Copaiba balsam | 3.0 |
| Trans-β-santalol | 3.0 |
| Coumarin | 3.0 |
| Cedarwood | 6.0 |
| Peru balsam | 3.0 |
| Terpineol | 55.0 |
| Musk xylol | 3.0 |
| Patchouli | 1.5 |
| Vetivert | 1.5 |
| Bergamot | 7.0 |
| Musk ambrette | 6.0 |
| Benzoin resin | 6.0 |
| | 100.0 |

COMPOSITION D
Fougere

| | |
|---|---|
| Lavender oil | 10 |
| Lavandin | 10 |
| Geranium bourbon | 8 |
| Oakmoss | 4 |
| Coumarin | 6 |
| Patchouli | 3 |
| Cedarwood | 10 |
| Cis- and trans-β-santalol [1] | 12 |
| Methyl salicylate | 1 |
| Terpinyl acetate | 12 |
| Amyl salicylate | 9 |
| Geraniol | 10 |
| Musk xylol | 5 |
| | 100 |

[1] Mixture of cis- and trans-isomers of β-santalol in a ratio of 1:1.8.

The components and proportions in the perfume compositions of this example can be adjusted according to the methods well known in the perfume art to form a wide variety of desirable perfume compositions containing odoriferously effective amounts of these compounds.

Example III.—Soap bar compositions

A conventional household soap bar having the following composition is prepared.

| Component: | Percent by weight |
|---|---|
| Sodium soap | 75.0 |
| Potassium soap (total soap comprises a mixture of 80% tallow soap and 20% coconut soap) | 7.5 |
| Water | 15.0 |
| Perfume Composition A of Example II | 2.5 |
| Total | 100.0 |

This soap bar exhibits a desirable sandal fragrance. Composition B, Composition C, or Composition D of Example II above can be substituted for Composition A in the above soap bar composition to obtain a rose de chine, chypre or fougere fragrance respectively.

Example IV.—Detergent compositions

A conventional, granular, heavy-duty built detergent having the following composition is prepared.

| Component: | Percent by weight |
|---|---|
| Sodium dodecyl benzene sulfonate | 20.0 |
| Sodium tripolyphosphate | 50.0 |
| Sodium silicate ($SiO_2:Na_2O$ ratio of 2:1) | 6.0 |
| Sodium sulfate | 14.0 |
| Water | 9.8 |
| Perfume Composition A of Example II | 0.2 |
| Total | 100.0 |

The detergent composition exhibits a desirable sandal fragrance. Composition B, Composition C, Composition D of Example II can be substituted for Composition A in the above example to obtain a rose de chine, chypre or fougere fragrance respectively.

What is claimed is:

1. A process for preparing β-santalol comprising the steps of:

(1) admixing in an anhydrous solvents, 3-methylbicyclo[2.2.1]heptan-2-one with a strong base selected from the group consisting of sodium amide, lithium amide, potassium amide, sodium hydride, potassium hydride, lithium hydride, trityl sodium, trityl potassium and trityl lithium in a molar ratio of 3-methylbicyclo[2.2.1]heptan-2-one to strong base of from about 1:1 to 1:1.5 and a weight ratio of 3-methylbicyclo[2.2.1]heptan-2-one to anhydrous solvent of from about 1:2 to 1:10, under inert atmosphere at a temperature of from about 80° C. to 130° C.; and subsequently adding thereto an allyl halide dissolved in an anhydrous solvent, said allyl halide being selected from the group consisting of allyl chloride, allyl bromide and allyl iodide, the weight ratio of allyl halide to said anhydrous solvent being from about 1:2 to 1:10, and the allyl halide being added in quantity sufficient to provide a molar ratio of 3-methylbicyclo[2.2.1]heptan-2-one to allyl halide of from about 2:1 to 1:5 while maintaining the temperature of the reaction mixture from about 30° C. to 170° C.;

(2) admixing in an anhydrous solvent, the reaction product of Step (1) with a methylmetallic compound selected from the group consisting of methyllithium and methylmagnesium bromide in a molar ratio of said reaction product to methylmetallic compound of from about 1:1 to 1:5 and a weight ratio of said reaction product to anhydrous solvent of from about 1:3 to 1:20, under inert atmosphere at a temperature of from about —20° C. to 10° C.; and subsequently hydrolyzing the mixture;

(3) contacting in a solvent, the reaction product of Step (2) with bromine in a molar ratio of said Step (2) reaction product to bromine of from about 1:0.8 to 1:1, a temperature of from about —20° C. to 20° C., and a weight ratio of Step (2) reaction product to solvent of from about 1:5 to 1:100;

(4) admixing in an anhydorus solvent, the reaction product of Step (3) with a strong base selected from the group consisting of sodium amide, potassium amide and lithium amide in a molar ratio of said Step (3) reaction product to strong base of from about 1:2 to 1:5 and a weight ratio of Step (3) reaction product to anhydrous solvent of from about 1:5 to 1:50 under an inert atmosphere at a temperature of from about room temperature to the reflux temperature of the reaction mixture;

(5) admixing in an anhydrous solvent, the reaction product of Step (4) with a dehydrating agent selected from the group consisting of thionyl chloride, phosphorus oxychloride, boron trifluoride, aluminum oxide, sulfuric acid and p-toluene sulfonic acid in a molar ratio of Step (4) reaction product to dehydrating agent of from about 100:1 to 1:20 and a Step (4) reaction product to anhydrous solvent weight ratio of from about 1:0.5 to 1:50, under an inert atmosphere at a temperature of from about —20° C. to 50° C.;

(6) admixing in an anhydrous solvent, the reaction product of Step (5) with a compound selected from the group consisting of di(sec-iso-amyl)borane, di-(methyl-1-en-9-yl)borane, di(cyclohexyl)borane and di(iso-butyl)aluminum hydride in a molar ratio of Step (5) reaction product to borane or aluminum compound of from about 1:0.9 to 1:1.1, and a Step (5) reaction product to anhydrous solvent weight ratio of from about 1:5 to 1:100, under an inert atmosphere at a temperature of from about —5° C. to 10° C.; and subsequently adding to the reaction mixture an aqueous solution of a base in combination with an aqueous solution of hydrogen peroxide;

(7) admixing in a solvent, the reaction product of Step (6) with (carbethoxyethylidene)triphenylphosphorane in a molar ratio of Step (6) reaction product to phosphorane compound of from about 1:1 to 1:5 and a Step (6) reaction product to solvent weight ratio of from about 1:2 to 1:20, at a temperature of from about 0° C. to 50° C.; and (8) admixing in an anhydrous solvent, the reaction product of Step (7) with a reducing agent selected from the group consisting of lithium aluminum hydride, sodium in an alcohol solvent, potassium in an alcohol solvent, and lithium in an alcohol solvent in a molar ratio of Step (7) reaction product to lithium aluminum hydride of from about 1:0.20 to 1:0.35 or a molar ratio of Step (7) reaction product to sodium in alcohol, potassium in alcohol or lithium in alcohol of from about 1:1 to 1:1.5 and a Step (7) reaction product to anhydrous solvent weight ratio of from about 1:5 to 1:50, under an inert atmosphere at a temperature of from about —50° C. to 20° C.

2. The process of claim 1
wherein, in Step (1), the 3-methylbicyclo[2.2.1]heptan-2-one is used in a molar ratio to the strong base of from about 1:1.05 to 1:1.1 and the 3-methylbicyclo[2.2.1]heptan-2-one is used in a molar ratio to the strong base of from about 1:1.05 to 1:1.1 and the 3-methylbicyclo[2.2.1]heptan-2-one is used in a molar ratio to the allyl halide of from about 1:1.05 to 1:1.1;
wherein, in Step (2), the Step (1) reaction product is used in a molar ratio to the methylmetallic compound of from about 1:1.05 to 1:1.1;
wherein, in Step (3), the Step (2) reaction product is used in a molar ratio to the bromine of from about 1:0.90 to 1:0.95;
wherein, in Step (4), the Step (3) reaction product is used in a molar ratio to the strong base of from about 1:2.05 to 1:3;
wherein, in Step (5), the Step (4) reaction product is used in a molar ratio to the dehydrating agent of from about 1:1 to 1:10; and
wherein in Step (7), the Step (6) reaction product is used in a molar ratio to the (carbethoxyethylidene) triphenylphosphorane of from about 1:1 to 1:2.

3. The process of claim 2
wherein, in Step (1), the strong base is sodium hydride or sodium amide and the allyl halide is allyl bromide;
wherein, in Step (2), the methylmetallic compound is methyllithium;
wherein, in Step (4), the strong base is sodium amide;
wherein, in Step (5), the dehydrating agent is thionyl chloride;
wherein, in Step (6), the compound is di(sec-iso-amyl)-borane; and
wherein, in Step (8), the reducing agent is lithium aluminum hydride.

4. The process of claim 2
wherein, in Step (1), the 3-methylbicyclo[2.2.1]heptan-2-one is dissolved in anhydrous solvent selected from the group consisting of aromatic hydrocarbon solvents, ether solvents, and aliphatic hydrocarbon solvents in a weight ratio of 3-methylbicyclo[2.2.1]heptan-2-one to anhydrous solvent of from about 1:3 to 1:7 and the allyl halide is dissolved in an anhydrous solvent selected from the group consisting of aromatic hydrocarbon solvents, ether solvent, and aliphatic hydrocarbon solvents, in a weight ratio of allyl halide to anhydrous solvent of from about 1:3 to 1:7;

wherein in Step (2), the Step (1) reaction product is dissolved in anhydrous solvent selected from the group consisting of ether solvents, aromatic hydrocarbon solvents, and aliphatic hydrocarbon solvents in a weight ratio to the anhydrous solvent of from about 1:5 to 1:10;

wherein, in Step (3), the Step (2) reaction product is dissolved in a solvent selected from the group consisting of chlorinated hydrocarbon solvents and aliphatic hydrocarbon solvents in a weight ratio to the solvent of from about 1:10 to 1:20;

wherein, in Step (4), the Step (3) reaction product is dissolved in an anhydrous solvent selected from the group consisting of aromatic hydrocarbon solvents and hexamethylphosphoramide in a weight ratio to solvent of from about 1:10 to 1:20;

wherein, in Step (5), the Step (4) reaction product is dissolved in an anhydrous solvent selected from the group consisting of halogenated hydrocarbon solvents, aromatic hydrocarbon solvents, aliphatic hydrocarbon solvents and ether solvents in a weight ratio of from about 1:5 to about 1:20;

wherein, in Step (6), the Step (5) reaction product is dissolved in an ether solvent in a weight ratio of from about 1:10 to 1:20;

wherein in Step (7), the Step (6) reaction product is dissolved in a solvent selected from the group consisting of chlorinated hydrocarbon solvents, alcohol solvents, polyol solvents and ether solvents in a weight ratio to solvent of from about 1:5 to 1:10; and wherein, in Step (8), if the reducing agent is lithium aluminum hydride the Step (7) reaction product is dissolved in an anhydrous solvent selected from the group consisting of ether solvents, aliphatic hydrocarbon solvents, and aromatic hydrocarbon solvents in a weight ratio to solvent of from about 1:10 to 1:20 and if the reducing agent is sodium in an alcohol solvent, potassium in an alcohol solvent, or lithium in an alcohol solvent, the Step (7) reaction product is dissolved in the alcohol solvent in a weight ratio to alcohol solvent of from about 1:10 to 1:20.

5. The process of claim 4
wherein the aromatic hydrocarbon solvents are selected from the group consisting of benzene, xylene and toluene;
wherein the aliphatic hydrocarbon solvents are selected from the group consisting of pentane, hexane, heptane, octane, cyclopentane, cyclohexane and cyclooctane;
wherein the ether solvents are selected from the group consisting of dimethyl ether, diethyl ether, methylethyl ether, dibutyl ether, tetrahydrofuran, 1,2-dimethoxyethane and dioxane;
wherein the chlorinated hydrocarbon solvents are selected from the group consisting of methylene chloride, chloroform, carbon tetrachloride and 1,2-dichloroethane;
wherein the alcohol solvents are selected from the group consisting of methanol, ethanol, propanol, iso-propanol, butanol and pentanol; and
wherein the polyol solvents are selected from the group consisting of ethylene glycol, propylene glycol and and glycerol.

6. The process of claim 5
wherein Step (3) is conducted at a temperature of from about $-5°$ C. to $5°$ C.;
wherein Step (4) is conducted at the reflux temperature if the solvent is an aromatic hydrocarbon solvent and at room temperature if the solvent is hexamethylphosphoramide;
wherein Step (5) is conducted at a temperature of about $-20°$ C. to $20°$ C.;
wherein Step (6) is conducted at a temperature of about $0°$ C.;
wherein Step (7) is conducted at a temperature of from about $20°$ C. to $30°$ C.; and
wherein Step (8) is conducted at a temperature of from about $-10°$ C. to $5°$ C.

References Cited
UNITED STATES PATENTS
3,478,114  11/1969  Lewis et al. _____ 260—631.5

OTHER REFERENCES

Colonge et al.: "Bull. Chem. Soc., France," 1966 (1), pp. 374-6 (1966).

LEON ZITVER, Primary Examiner

N. MORGENSTERN, Assistant Examiner

U.S. Cl. X.R.

252—522; 260—488 B, 586 R, 617 R, 666 PY, 598